US007171278B2

(12) United States Patent
Baker et al.

(10) Patent No.: US 7,171,278 B2
(45) Date of Patent: Jan. 30, 2007

(54) OPTIMIZED PLANER FEEDER SYSTEM AND METHOD

(75) Inventors: Lyle Baker, Salmon Arm (CA); Ray Stevens, Salmon Arm (CA)

(73) Assignee: COE Newnes/McGehee Inc., Salmon Arm (CA)

( * ) Notice: Subject to any disclaimer, the term of this patent is extended or adjusted under 35 U.S.C. 154(b) by 434 days.

(21) Appl. No.: 10/857,852

(22) Filed: Jun. 2, 2004

(65) Prior Publication Data

US 2004/0250913 A1 Dec. 16, 2004

Related U.S. Application Data

(60) Provisional application No. 60/474,953, filed on Jun. 3, 2003.

(51) Int. Cl.

| | |
|---|---|
| ***G05B 13/02*** | (2006.01) |
| ***B23Q 15/00*** | (2006.01) |
| ***B23Q 16/00*** | (2006.01) |
| ***B27C 1/00*** | (2006.01) |

(52) U.S. Cl. ..................... 700/28; 144/356; 144/114.1; 144/369; 144/373; 144/382; 144/363; 144/394; 451/8

(58) Field of Classification Search .................. 700/28; 144/117.1, 400, 257, 373, 363, 382; 451/8
See application file for complete search history.

(56) References Cited

U.S. PATENT DOCUMENTS

| | | | |
|---|---|---|---|
| 4,457,350 | A | 7/1984 | Finnila |
| 4,611,646 | A | 9/1986 | Wassmer et al. |
| 5,174,348 | A | 12/1992 | Miyamoto et al. |
| 5,396,938 | A | 3/1995 | Cannaday |
| 6,470,932 | B1 | 10/2002 | Grivna et al. |
| 6,533,642 | B1 | 3/2003 | Dyer |
| 6,666,246 | B2 | 12/2003 | Gilbert |

*Primary Examiner*—Anthony Knight
*Assistant Examiner*—Sunray Chang
(74) *Attorney, Agent, or Firm*—Antony C. Edwards

(57) ABSTRACT

An apparatus for optimizing orientation of a workpiece in a planermill for feeding of the workpiece into a planer includes an infeed to the planer, a workpiece turner for selectively turning the workpiece end-for-end upstream of the planer on the infeed a workpiece flipper for selectively flipping the workpiece one hundred eighty degrees about a longitudinal axis of the workpiece upstream of the planer on the infeed, a scanner on the infeed upstream of the workpiece turner and workpiece flipper for detecting defects on the workpiece, a processor cooperating with the scanner, the workpiece turner and the workpiece flipper for optimizing the orientation of the workpiece relative to status and actively translatable cutterheads in the planer.

15 Claims, 30 Drawing Sheets

2 X 4 Planer Example

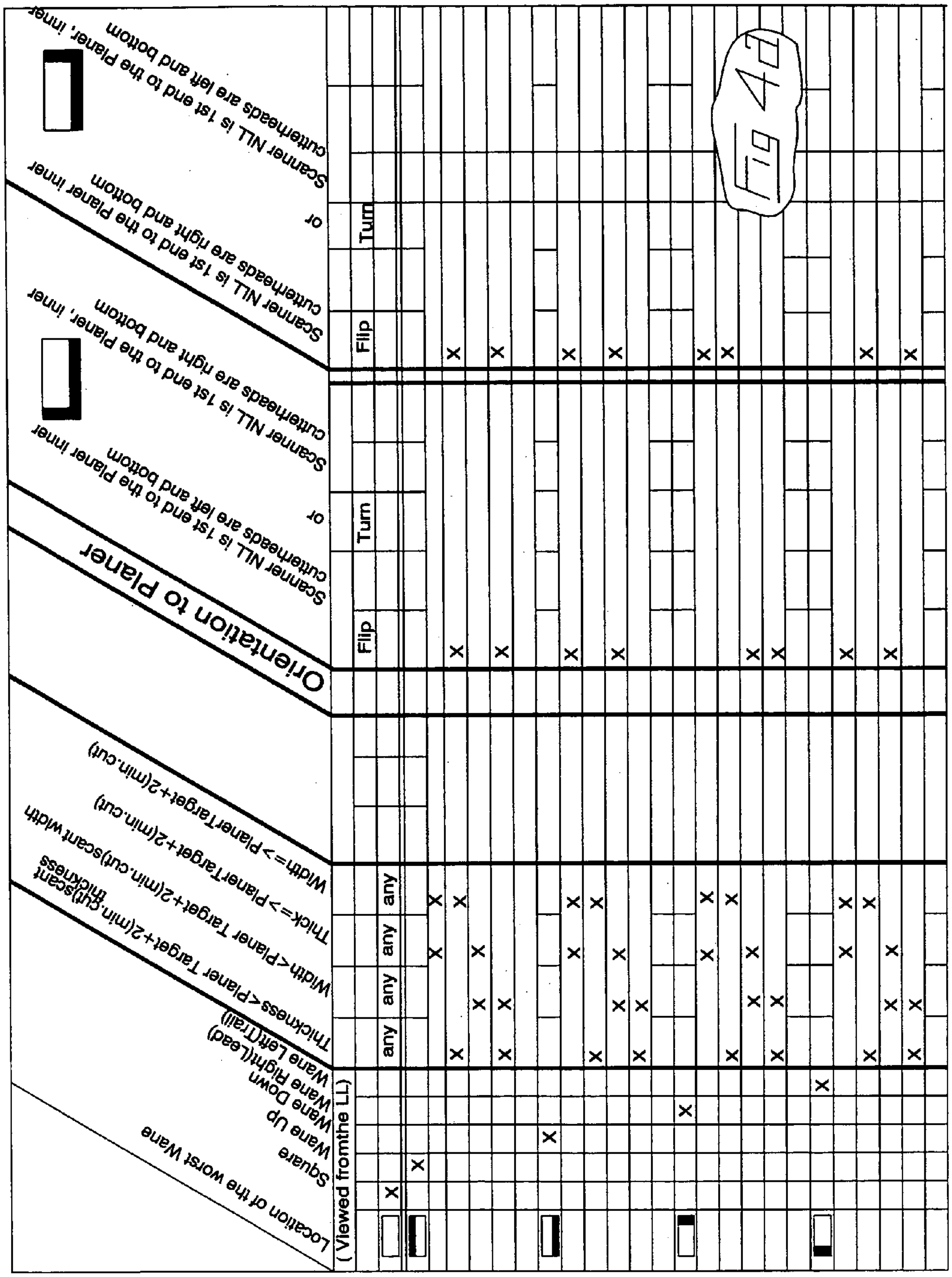
Location of the worst Wane
( Viewed fromthe LL)
Square
Wane Up
Wane Down
Wane Right(Lead)
Wane Left(Trail)
Thickness<Planer Target+2(min.cut)scant thickness
Width<Planer Target+2(min.cut)scant width
Thick=>PlanerTarget+2(min.cut)
Width=>PlanerTarget+2(min.cut)
any
Orientation to Planer
Scanner NL is 1st end to the Planer inner cutterheads are left and bottom
or
Scanner NL is 1st end to the Planer inner cutterheads are right and bottom
Flip
Turn
Fig 4d

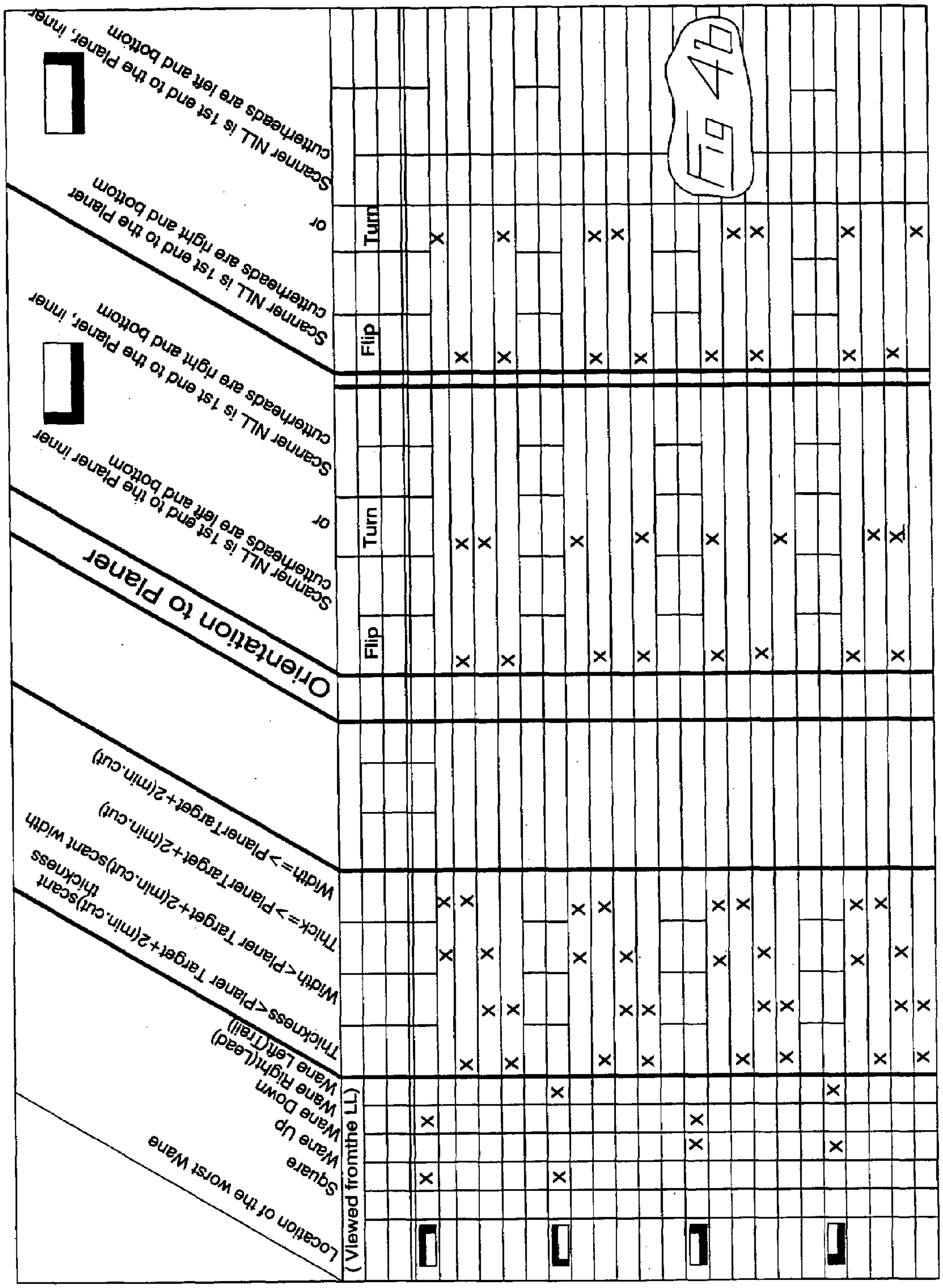
Scanner NLL is 1st end to the Planer, inner cutterheads are left and bottom
or
Scanner NLL is 1st end to the Planer cutterheads are right and bottom
Scanner NLL is 1st end to the Planer, inner cutterheads are right and bottom
or
Scanner NLL is 1st end to the Planer inner cutterheads are left and bottom
Orientation to Planer
Flip
Turn
Width=>PlanerTarget+2(min.cut)
Thick=>PlanerTarget+2(min.cut)
Width<Planer Target+2(min.cut)scant width
Thickness<Planer Target+2(min.cut)scant thickness
Wane Left(Trail)
Wane Right(Lead)
Wane Down
Wane Up
Square
Location of the worst Wane
(Viewed fromthe LL)
Fig 4b FIGURE 11a

| CELL REFERENCE NO. | OPTIMIZER DECISION |
|---|---|
| Y63 | Edge is sacrificed for Face. |
| R64 | The Edge that should face out is sacrificed for Face due to deficient thickness. |
| S65 | The Edge that should face in is sacrificed for Face that is best faced out. |
| X66 | Edge is sacrificed for Face. |
| X67 | Face that should be out is sacrificed for edge that should be out. |
| S68 | The scant face that should be down is sacrificed for the Edge that should be out. |
| R69 | The face that should be out is sacrificed for the scant edge. |
| Y70 | Face that should be in is sacrificed for Edge that should be in. |
| X71 | Orient worst face (wide or narrow) against the outer cutterheads: In this case, edge (narrow face) is worst |
| Y71 | Orient worst face (wide or narrow) against the outer cutterheads: In this case, face (wide face) is worst. |
| R72 | Optimize for the worst face (wide or narrow) ranking by quality/qualities. An example of qualities to include in the rankings may be 'torn grain', knots, wane and/or 'less than full target size' (off-size). For example: The worst wane may indeed be on the narrow face indicated, but the combination of wide face wane and thickness off-size may make the wide face the worst face.<br>*In this case, put the wide face (worst face) against the inner cutterheads. |
| S72 | Optimize for the worst face (wide or narrow) ranking by quality/qualities. An example of qualities to include in the rankings may be 'torn grain', knots, wane and/or 'less than full target size' (off-size). For example: The wane on the narrow face may result in a worst face than the combination of wide face wane & off-sizing.<br>*In this case, put the narrow face (worst face) against the outer cutterheads. |
| R73 | Optimize for the worst face (wide or narrow) ranking by quality/qualities. An example of qualities to include in the rankings may be 'torn grain', knots, wane and/or 'less than full target size' (off-size). For example: The worst wane may indeed be on the wide face indicated, but the combination of edge wane and width off-sizing may make the narrow face the worst face.<br>In this case, put the edge (worst face) against the inner cutterheads. |
| S73 | Optimize for the worst face (wide or narrow) ranking by quality/qualities. An example of qualities to include in the rankings may be 'torn grain', knots, wane and/or 'less than full target size' (off-size). For example: The wane on the wide face may result in a worst face than the combination of edge wane & off-sizing.<br>*In this case, put the wide face (worst face) against the outer cutterheads. |
| X74 | Orient worst face (wide or narrow) against the inner cutterheads: In this case, face (wide face) is worst. |
| Y74 | Orient worst face (wide or narrow) against the inner cutterheads: In this case, edge (narrow face) is worst |
| X78 | On-size Edge is sacrificed for Scant Face |
| Y79 | Scant Edge is sacrificed for On-size Face |
| R80 | Edge is sacrificed for Face |
| R81 | On-size Face is sacrificed for On-size Edge |
| Y82 | Scant Face is sacrificed for On-size Edge |
| X83 | On-size Face is sacrificed for Scant Edge |
| S84 | Face is sacrificed for Edge |
| R85 | Orient worst face (wide or narrow) against the outer cutterheads: In this case, edge (narrow face) is worst |
| S85 | Orient worst face (wide or narrow) against the outer cutterheads: In this case, face (wide face) is worst. |

FIGURE 11b

| | |
|---|---|
| X86 | Optimize for the worst face (wide or narrow) ranking by quality/qualities. An example of qualities to include in the rankings may be 'torn grain', knots, wane and/or 'less than full target size' (off-size). For example: The worst wane may indeed be on the narrow face indicated, but the combination of wane and off-size may make the wide face the worst face.<br>*In this case, put the wide face (worst face) against the inner cutterheads. |
| Y86 | Optimize for the worst face (wide or narrow) ranking by quality/qualities. An example of qualities to include in the rankings may be 'torn grain', knots, wane and/or 'less than full target size' (off-size). For example: The wane on the narrow face may result in a worst face than the combination of wide face wane & off-sizing.<br>*In this case, put the narrow face (worst face) against the outer cutterheads. |
| X87 | Optimize for the worst face (wide or narrow) ranking by quality/qualities. An example of qualities to include in the rankings may be 'torn grain', knots, wane and/or 'less than full target size' (off-size). For example: The worst wane may indeed be on the wide face indicated, but the combination of wane and off-size may make the narrow face the worst face<br>*In this case, put the edge (worst face) against the inner cutterheads. |
| Y87 | Optimize for the worst face (wide or narrow) ranking by quality/qualities. An example of qualities to include in the rankings may be 'torn grain', knots, wane and/or 'less than full target size' (off-size). For example: The wane on the wide face may result in a worst face than the combination of narrow edge wane & off-sizing.<br>*In this case, put the wide face (worst face) against the outer cutterheads. |
| R88 | Orient worst face (wide or narrow) against the inner cutterheads: In this case, face (wide face) is worst. |
| S88 | Orient worst face (wide or narrow) against the inner cutterheads: In this case, edge (narrow face) is worst. |
| R91 | On-size Edge is sacrificed for On-size Face |
| Y92 | On-size Edge is sacrificed for Scant Face |
| X93 | Scant Edge is sacrificed for On-size Face |
| S94 | Scant Edge is sacrificed for Scant Face |
| S95 | On-Size Face is sacrificed for On-size Edge |
| X96 | Scant Face is sacrificed for On-size Edge |
| Y97 | On-size Face is sacrificed for Scant Edge |
| R98 | Face is sacrificed for Edge |
| R99 | Orient worst face (wide or narrow) against the outer cutterheads: In this case, face (wide face) is worst. |
| S99 | Orient worst face (wide or narrow) against the outer cutterheads: In this case, edge (narrow face) is worst. |
| X100 | Optimize for the worst face (wide or narrow) ranking by quality/qualities. An example of qualities to include in the rankings may be 'torn grain', knots, wane and/or 'less than full target size' (off-size). For example: The wane on the narrow face may result in a worst face than the combination of wide face wane & off-sizing.<br>*In this case, put the narrow face (worst face) against the outer cutterheads. |
| Y100 | Optimize for the worst face (wide or narrow) ranking by quality/qualities. An example of qualities to include in the rankings may be 'torn grain', knots, wane and/or 'less than full target size' (off-size). For example: The worst wane may indeed be on the narrow face indicated, but the combination of wane and off-size may make the wide face the worst face.<br>*In this case, put the wide face (worst face) against the inner cutterheads. |
| X101 | Optimize for the worst face (wide or narrow) ranking by quality/qualities. An example of qualities to include in the rankings may be 'torn grain', knots, wane and/or 'less than full target size' (off-size). For example: The wane on the wide face may result in a worst face than the combination of narrow edge wane & off-sizing.<br>*In this case, put the wide face (worst face) against the outer cutterheads. |

FIGURE 11c

| | |
|---|---|
| Y101 | Optimize for the worst face (wide or narrow) ranking by quality/qualities. An example of qualities to include in the rankings may be 'torn grain', knots, wane and/or 'less than full target size' (off-size). For example: The worst wane may indeed be on the wide face indicated, but the combination of wane and off-size may make the narrow face the worst face.<br>*In this case, put the edge (worst face) against the inner cutterheads. |
| R102 | Orient worst face (wide or narrow) against the inner cutterheads: In this case, edge (narrow face) is worst. |
| S102 | Orient worst face (wide or narrow) against the inner cutterheads: In this case, face (wide face) is worst. |
| X105 | On-size Edge is sacrificed for On-size Face |
| S106 | On-Size Edge is sacrificed for Scant Face |
| R107 | Scant Edge is sacrificed for On-Size Face |
| Y108 | Edge is sacrificed for Face |
| Y109 | On-size Face is sacrificed for On-size Edge |
| R110 | Scant Face is sacrificed for On-Size Edge |
| S111 | On-size Face is sacrificed for Scant Edge |
| X112 | Scant Face is sacrificed for Scant Edge |
| X113 | Orient worst face (wide or narrow) against the outer cutterheads: In this case, face (wide face) is worst. |
| Y113 | Orient worst face (wide or narrow) against the outer cutterheads: In this case, edge (narrow face) is worst. |
| R114 | Optimize for the worst face (wide or narrow) ranking by quality/qualities. An example of qualities to include in the rankings may be 'torn grain', knots, wane and/or 'less than full target size' (off-size). For example: The wane on the narrow face may result in a worst face than the combination of wide face wane & off-sizing.<br>*In this case, put the narrow face (worst face) against the outer cutterheads. |
| S114 | Optimize for the worst face (wide or narrow) ranking by quality/qualities. An example of qualities to include in the rankings may be 'torn grain', knots, wane and/or 'less than full target size' (off-size). For example: The worst wane may indeed be on the narrow face indicated, but the combination of wane and off-size may make the wide face the worst face.<br>*In this case, put the wide face (worst face) against the inner cutterheads. |
| R115 | Optimize for the worst face (wide or narrow) ranking by quality/qualities. An example of qualities to include in the rankings may be 'torn grain', knots, wane and/or 'less than full target size' (off-size). For example: The wane on the wide face may result in a worst face than the combination of narrow edge wane & off-sizing.<br>*In this case, put the wide face (worst face) against the outer cutterheads. |
| S115 | Optimize for the worst face (wide or narrow) ranking by quality/qualities. An example of qualities to include in the rankings may be 'torn grain', knots, wane and/or 'less than full target size' (off-size). For example: The worst wane may indeed be on the wide face indicated, but the combination of wane and off-size may make the narrow face the worst face.<br>*In this case, put the edge (worst face) against the inner cutterheads. |
| X116 | Orient worst face (wide or narrow) against the inner cutterheads: In this case, edge (narrow face) is worst. |
| Y116 | Orient worst face (wide or narrow) against the inner cutterheads: In this case, face (wide face) is worst. |

OPTIMIZED PLANER FEEDER SYSTEM AND METHOD

CROSS REFERENCE TO RELATED APPLICATION

This application claims priority from U.S. Provisional Patent Application No. 60/474,953 filed Jun. 3, 2003 entitled Optimized Planer Feeder System and Method.

FIELD OF THE INVENTION

The present invention relates generally to a planer feeder optimizer and more specifically it relates to an optimized planer feeder system and method for improved recovery, grade uplift, and optimum wane orientation at the planer-mill.

BACKGROUND OF THE INVENTION

In the prior art, planer mills have been orienting the lumber fed into the planer to place the most wane face and/or edge to the planer cutter which removes the largest amount of material thus providing the least wane on the finished planed lumber. Planer feeder automation systems have been in use for years. Typically, planer feeder automation includes piece orientation as described in a Forintek document #680-3366 dated August 2001. The lug loader such as described in U.S. Pat. No. 4,869,360 singulates the pieces and loads them onto a transfer for processing through a transverse scanner. The scanner and associated processor makes a decision and the piece is then processed to “Flip” the piece as necessary using a board flipper.

The main problem with the conventional manual planer infeed is that the operator would have to flip 100% of the pieces to properly view all faces, and some portion of those twice if the worse face is not correct after the first flip. Another problem with the conventional planer feeder is that when pieces press against each other, it makes flipping harder due to friction. With planers running at ever-faster speeds, the planer infeed operator may be taxed beyond his ability to consistently flip pieces to remove the most wane/defect from the worst face. Some of the pieces will require flipping and turning to orient the wane to the greatest depth-of-cut cutting tools.

Other systems have incorporated measurement and optimization of the piece in the sawmill, marking the piece, and then manually flipping the piece in the planer mill based on the faces marked. A further problem with the sawmill marking system is that the drying process may introduce other grade limiting characteristics which would change the decision. An improperly oriented piece has potential for either grade or volume depreciation.

Another prior art system of which applicant is aware employs a scanner in the planer mill to measure the wane and then sets the planer guides and cutters to place the heaviest cut at the most wane surfaces. This requires that the planer setworks make the adjustment rapidly between pieces or during the leading end processing where the variant material must later be trimmed. After drying, typical rough lumber has some excess length which will be trimmed after planing. This excess length could be as little as 1/16 inch or much higher if end trimming is required to remove poor grade material. A planer running at 2000 ft/min and processing ribbon feed material (ends butted) would need to rapidly set between pieces to achieve the same result as the described invention. For example, if setting is allowed to spoil 1/8 inch of length to be later trimmed off, the setting must occur in: $\frac{2000\ \text{ft}}{\text{min}} = \frac{2000\ (12)}{60}$ inches/sec = 400 inches/sec.

1/8 inch of length, or 0.125"=0.0003125 seconds at 400 inches/sec which is a challenge and may not be feasible. If the mill allows an extra one inch in length then the sets must be achieved within 0.0025 seconds, which is still a challenge. The process could include a suitable gap between pieces to allow for the machine setting time and suffer the lost throughput as well as excessive machine beating as the planer rolls bounce from wood to no wood to wood again.

In the example of a nominal so-called ‘2×4’ or 2×4 board illustrated in FIG. 1*a*, the board thickness before going into the planer may be 1.650 inches (faces C, D) and the board width before going into the planer may be 3.700 inches (faces A, B). To achieve finished dimensions of 1.5 inches thickness, 3.7 inches width, the following amounts of excess wood may be removed by the planer:

| | | |
|---|---|---|
| *a*) | 1.650″ | thickness |
| | −0.032 | fixed thickness removed from face B |
| | = 1.618″ | |
| *b*) | 1.618″ | |
| | −0.118″ | Excess thickness removed from face A |
| | = 1.500″ | Finished thickness Dimension |
| *c*) | 3.700″ | width |
| | −0.032″ | Fixed width removed from edge D |
| | = 3.668″ | |
| *d*) | 3.668″ | |
| | −0168 | Excess width removed from edge C |
| | = 3.500″ | Finished width Dimension |

SUMMARY OF THE INVENTION

Grade uplift opportunity is achieved by orientation of the board so that the fixed cut 0.032" is from the best face and edge i.e. having the least wane which may be wane free. The larger cut made by the variably positioned cutter head in the planer is then removed from the edge and face with the most wane thus producing a finished board with the least wane.

In these and other respects, the optimized planer feeder system and method according to the present invention substantially departs from the conventional concepts and designs of the prior art, and in so doing provides an apparatus primarily developed for the purpose of improved recovery, higher throughput, and grade uplift through automatic optimum wane orientation at the planermill.

The general purpose and object of the present invention, which will be described subsequently in greater detail, is to provide a new optimized automatic planer feeder system and method that has many of the advantages of the planer feeder optimizer mentioned heretofore and many novel features that result in a new optimized planer feeder system and method which is not anticipated, rendered obvious, suggested, or implied by any of the prior art planer feeder optimizers, either alone or in any combination thereof.

To attain this, the present invention generally comprises measurement and evaluation of a work piece in a planer mill, usually although not necessarily after drying, and then automatically orienting the work piece for highest value. The invention also provides the means to measure the lumber in either linear or lateral flow, determining the optimum orientation, and turn, flip and /or turn and flip the pieces as appropriate to optimize the orientation of the work piece in the planer. The "Flip" operation rotates the piece 180 degrees around the long axis. Thus the top face becomes the bottom face. The "Turn" operation rotates the piece so the ends are swapped. What was the leading end into the planer becomes the trailing end. In the disclosure which follows pieces or workpieces of lumber are referred to collectively, and without intending to be limiting, as boards or pieces although it is understood that the use of boards or pieces is intended to refer to any type of lumber piece or product.

In the following list of stated objects, it not being intended that any one of which is intended to be limiting or critical to the operation of the invention, another object of the present invention then is to provide an optimized planer feeder system and method that measures and evaluates the pieces after drying in the planer mill and then automatically orients the piece for highest value. This orientation may involve flipping, turning and /or flipping and turning.

Another object is to provide an optimized planer feeder system and method that evaluates the final trim decision for best wane orientation to the planer at the planermill. All four faces are adjudicated to determine the worst narrow and/or wide face.

Another object is to provide an optimized planer feeder system and method that automatically orients to maximize the wide face or narrow face or both faces of the piece and hence the highest grade and/or appearance.

Another object is to provide an optimized planer feeder system and method that includes the capability of modifying the settings within grade to achieve ideal end match conditions so the planer controls require no abrupt motions between pieces.

Another object is to provide an optimized planer feeder system and method that may be ribbon fed and does not have to make large moves between pieces.

Another object is to provide an optimized planer feeder system and method that can determine the effects on grade by other board characteristics such as knots, splits, crook, bow, strength, and adjust the orientation and or planer settings so that the wane produced is consistent with the other grade limiting characteristics.

Another object of the invention is to evaluate the piece and remove recoverable trim blocks prior to planing so that the trim blocks may be fingerjointed and then planed to size, taking advantage of the excess wood to maximize grade and recovery.

Another object of the invention is to provide the ability to detect and remove a sniped end prior to entering the planer.

Another object of the invention is to collect a batch of problem pieces and then reset the planer cutters and guides to better process the batch.

Another object of the invention is to optimize the piece for processing in a so-called "Bang—Bang" planer, as it would be known to one skilled in the art, which can force the piece to either left or right or centered guides.

Another object of the invention is to measure the piece and to remove problem pieces prior to entering the planer. This includes excessive crook, bow or wane and broken ends.

Another object of the invention is to consider the priority face or edge when orienting the piece in a system, which may only flip or turn but not both. For example, edges take preference over the wide face in the stud product.

To the accomplishment of the above and related objects, this invention may be embodied in the form illustrated in the accompanying drawings, attention being called to the fact, however, that the drawings are illustrative only, and that changes may be made in the specific construction illustrated.

In summary, the present invention may be characterized in one aspect as an apparatus for optimizing orientation of a workpiece in a planermill for feeding into a planer wherein the planer includes:

a) a selectively actuable first cutterhead adjacent a first wide surface of the workpiece when in the planer, wherein the selectively actuable first cutterhead is selectively actuable so as to selectively adjust a depth of cut of the selectively actuable first cutterhead when planning the workpiece;
b) a fixed depth-of-cut second cutterhead adjacent a second wide surface opposite to the first wide surface;
c) a selectively actuable third cutterhead adjacent a first edge surface of the workpiece, wherein the third cutterhead is selectively actuable to adjust a depth-of-cut of the third cutterhead when planning the workpiece; and
d) a fixed depth-of-cut fourth cutterhead adjacent a second edge surface opposite to the first edge surface.

The apparatus includes infeed means to the planer, means for selectively turning the workpiece end-for-end upstream of the planer on the infeed means, and means for selectively flipping the workpiece one hundred eighty degrees about its longitudinal axis upstream of the planer on the infeed means.

The method of optimizing orientation of the workpiece for feeding into the planer includes the steps of:

a) receiving data from a scanner for processing;
b) processing the received data from the scanner to detect and identify the location of the worst defects on the first and second oppositely oriented wide surfaces and on the first and second oppositely oriented edge surfaces of the workpiece;
c) orienting the workpiece by only flipping the workpiece one hundred eighty degrees about its longitudinal axis, when in the processing it is determined that:
    (i) a worst defect exists on only the first wide surface of the workpiece and the workpiece has:
        a) scant thickness and non-scant width, or
        b) scant thickness and scant width;
    (ii) a worst defect exists on only the second wide surface and the workpiece and the workpiece has:
        a) non-scant thickness and non-scant width, or
        b) non-scant thickness and scant width;
    (iii) a worst defect exists on only the first edge surface and the workpiece has:
        a) non-scant thickness and scant width, or
        b) scant thickness and scant width;
    (iv) a worst defect exists on only the second edge surface and the workpiece has:
        a) non-scant thickness and non-scant width, or
        b) non-scant thickness and scant width;
    (v) worst defects exist on only the first wide surface and the first edge surface, and the workpiece has scant thickness and scant width;
    (vi) worst defects exist on only the first wide surface and the second edge surface, and the workpiece has scant thickness and non-scant width;
    (vii) worst defects exist on only the second wide surface and the first edge surface, and the workpiece has non-scant thickness and scant width; or (viii) worst defects exist on only the second wide surface and the second edge surface, and the workpiece has non-scant thickness and non-scant width;

d) orienting the workpiece by only turning the workpiece one hundred eighty degrees about an axis generally orthogonal to the wide surfaces so as to turn the workpiece end-for-end, when in the processing it is determined that:

(i) worst defects exist on only the first wide surface and the first edge surface of the workpiece and the workpiece has non-scant thickness and scant width;

(ii) worst defects exist on only the first wide surface and the second edge surface of the workpiece and the workpiece has non-scant thickness and non-scant width;

(iii) worst defects exist on only the second wide surface and first edge surface, and the workpiece has scant thickness and scant width; or (iv) worst defects exist on only the second wide surface and the second edge surface, and the workpiece has scant thickness and non-scant width; or, e) orienting the workpiece by turning and flipping the workpiece one hundred eighty degrees end-for-end and one hundred and eighty degrees about its longitudinal axis respectively, when in the processing it is determined that:

(i) worst defects exist on only the first wide surface and the first edge surface and the workpiece has scant thickness and non-scant width;

(ii) worst defects exist on only the first wide surface and the second edge surface and the workpiece has scant thickness and scant width;

(iii) worst defects exist on only the second wide surface and the first edge surface and the workpiece has non-scant thickness and non-scant width; or (iv) worst defects exist on only the second wide surface and the second edge surface and the workpiece has non-scant thickness and scant width.

In the above and in what follows face or edge priority may be weighted as a preference when the optimizer is optimizing the piece orientation decision.

In a further aspect the present invention may be characterized as a computer program product including:

a) a computer usable medium having computer readable program code means embodied in the medium for causing receiving data from the scanner for processing;

b) computer readable program code means for causing processing the received data from the scanner to detect and identify the location of the worst defects on the first and second oppositely oriented wide surfaces and on the first and second oppositely oriented edge surfaces of the workpiece;

c) computer readable program code means for causing orienting the workpiece by only flipping the workpiece one hundred eighty degrees about its longitudinal axis, when in the processing it is determined that:

(i) a worst defect exists on only the first wide surface of the workpiece and the workpiece has:

a) scant thickness and non-scant width, or b) scant thickness and scant width;

(ii) a worst defect exists on only the second wide surface and the workpiece and the workpiece has:

a) non-scant thickness and non-scant width, or b) non-scant thickness and scant width;

(iii) a worst defect exists on only the first edge surface and the workpiece has:

a) non-scant thickness and scant width, or b) scant thickness and scant width;

(iv) a worst defect exists on only the second edge surface and the workpiece has:

a) non-scant thickness and non-scant width, or b) non-scant thickness and scant width;

(v) worst defects exist on only the first wide surface and the first edge surface, and the workpiece has scant thickness and scant width;

(vi) worst defects exist on only the first wide surface and the second edge surface, and the workpiece has scant thickness and non-scant width;

(vii) worst defects exist on only the second wide surface and the first edge surface, and the workpiece has non-scant thickness and scant width; or (viii) worst defects exist on only the second wide surface and the second edge surface, and the workpiece has non-scant thickness and non-scant width;

d) computer readable program code means for causing orienting the workpiece by only turning the workpiece one hundred eighty degrees about an axis generally orthogonal to the wide surfaces so as to turn the workpiece end-for-end, when in the processing it is determined that:

(i) worst defects exist on only the first wide surface and the first edge surface of the workpiece and the workpiece has non-scant thickness and scant width;

(ii) worst defects exist on only the first wide surface and the second edge surface of the workpiece and the workpiece has non-scant thickness and non-scant width;

(iii) worst defects exist on only the second wide surface and first edge surface, and the workpiece has scant thickness and scant width; or (iv) worst defects exist on only the second wide surface and the second edge surface, and the workpiece has scant thickness and non-scant width;

e) computer readable program code means for causing orienting the workpiece by turning and flipping the workpiece one hundred eighty degrees end-for-end and about its longitudinal axis respectively, when in the processing it is determined that:

(i) worst defects exist on only the first wide surface and the first edge surface and the workpiece has scant thickness and non-scant width;

(ii) worst defects exist on only the first wide surface and the second edge surface and the workpiece has scant thickness and scant width;

(iii) worst defects exist on only the second wide surface and the first edge surface and the workpiece has non-scant thickness and non-scant width; or (iv) worst defects exist on only the second wide surface and the second edge surface and the workpiece has non-scant thickness and scant width.

In yet a further aspect the present invention may be characterized as including:

a) infeed means to the planer, means for selectively turning the workpiece end-for-end upstream of the planer on the infeed means, and means for selectively flipping the workpiece one hundred eighty degrees about a longitudinal axis of the workpiece upstream of the planer on the infeed means, b) a scanner on the infeed means for detecting defects on the workpiece, the scanner upstream of the means for selectively turning the workpiece and the means for selectively flipping the workpiece, and c) a processor cooperating with the scanner and the means for selectively turning the workpiece and the means for selectively flipping the workpiece for optimizing the orientation of the workpiece relative to the first, second, third and fourth cutterheads.

The processor may include:

a) means for receiving data from the scanner for processing in the processor,
b) means for processing the received data from the scanner to detect and identify the location of worst defects on the first and second oppositely oriented wide surfaces and on the first and second oppositely oriented edge surfaces of the workpiece,
c) means for actuating the means for selectively flipping the workpiece so as to orient the workpiece by only flipping the workpiece one hundred eighty degrees about its longitudinal axis, when the means for processing determines that:
    (i) a worst defect exists on only the first wide surface of the workpiece and the workpiece has:
        a) scant thickness and non-scant width, or
        b) scant thickness and scant width;
    (ii) a worst defect exists on only the second wide surface and the workpiece and the workpiece has:
        a) non-scant thickness and non-scant width, or
        b) non-scant thickness and scant width;
    (iii) a worst defect exists on only the first edge surface and the workpiece has:
        a) non-scant thickness and scant width, or
        b) scant thickness and scant width;
    (iv) a worst defect exists on only the second edge surface and the workpiece has:
        a) non-scant thickness and non-scant width, or
        b) non-scant thickness and scant width;
    (v) worst defects exist on only the first wide surface and the first edge surface, and the workpiece has scant thickness and scant width;
    (vi) worst defects exist on only the first wide surface and the second edge surface, and the workpiece has scant thickness and non-scant width;
    (vii) worst defects exist on only the second wide surface and the first edge surface, and the workpiece has non-scant thickness and scant width; or
    (viii) worst defects exist on only the second wide surface and the second edge surface, and the workpiece has non-scant thickness and non-scant width;
d) means for actuating the means for selectively turning the workpiece so as to orient the workpiece by only turning the workpiece one hundred eighty degrees about an axis generally orthogonal to the wide surfaces so as to turn the workpiece end-for-end, when the means for processing determines that:
    (i) worst defects exist on only the first wide surface and the first edge surface of the workpiece and the workpiece has non-scant thickness and scant width;
    (ii) worst defects exist on only the first wide surface and the second edge surface of the workpiece and the workpiece has non-scant thickness and non-scant width;
    (iii) worst defects exist on only the second wide surface and first edge surface, and the workpiece has scant thickness and scant width; or
    (iv) worst defects exist on only the second wide surface and the second edge surface, and the workpiece has scant thickness and non-scant width;
e) means for actuating the means for selectively turning the workpiece and the means for selectively flipping the workpiece so as to orient the workpiece by turning and flipping the workpiece one hundred eighty degrees about its longitudinal axis respectively, when the means for processing determines that:
    (i) worst defects exist on only the first wide surface and the first edge surface and the workpiece has scant thickness and non-scant width;
    (ii) worst defects exist on only the first wide surface and the second edge surface and the workpiece has scant thickness and scant width;
    (iii) worst defects exist on only the second wide surface and the first edge surface and the workpiece has non-scant thickness and non-scant width; or
    (iv) worst defects exist on only the second wide surface and the second edge surface and the workpiece has non-scant thickness and scant width.

The means for selectively turning the workpiece may include:

a) a selectively actuable workpiece diverter on the infeed means for selectively removing a workpiece from the infeed means,
b) a turn transfer cooperating with the workpiece diverter,
c) a return transfer for translating the workpiece, once turned, upstream along the infeed means,
d) a workpiece conveyer for conveying the workpiece from the return transfer to the infeed means once upstream along the infeed means.

The means for selectively flipping the workpiece may include an automatic board turner for flipping the workpiece about its longitudinal axis.

In a preferred embodiment the scanner is for detecting wane on the workpiece, and the worst defects are areas of worst wane on the surfaces of the workpiece. The scanner may be an optical scanner. The workpiece diverter may be a dropout gate. The turn transfer may be a one hundred eighty degree arcuate transfer extending under the infeed means. A lateral conveyer may feed the workpiece from the dropout gate onto the turn transfer. The return transfer may be parallel to the infeed means. Both the return transfer and the infeed means may include lugged transfer chains.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIGS. 4*a* and 4*b* are a tabular representation of the decision logic required to orient boards for optimal planing based on location of the wane.

FIGS. 11*a*–11*c* are tabular descriptions of optimizer decision correlated to individual decision cells in the tables of FIGS. 10*a*–10*h*.

DETAILED DESCRIPTION OF EMBODIMENTS OF THE INVENTION

Figure 2B:
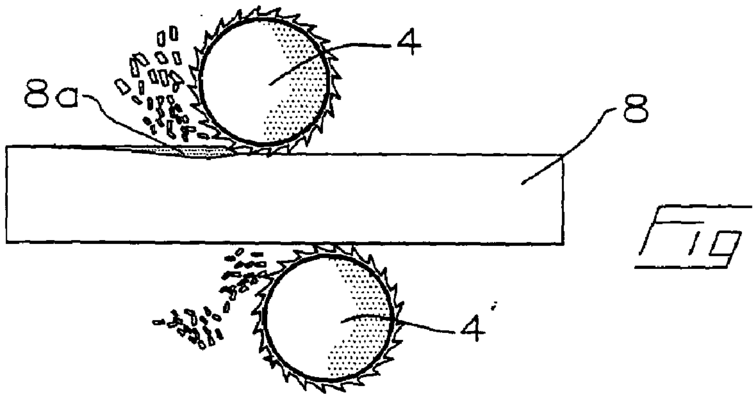
FIG. 2*b* is the depth of cut effect on a board with the wane being removed by the moveable cutterhead.

Turning now descriptively to the drawings, in which similar reference characters denote similar elements throughout the several views, the attached figures illustrate an optimized planer feeder system and method, which comprises, firstly, measurement and evaluation of a board for example after drying in the kilns, although lumber may be planed before drying, in a planer mill, and secondly, automatically orienting the board for highest value planing in the planer. The invention also provides the means to measure the board in either linear or lateral flow, determining the optimum orientation, and then to turn, flip and turn, or only flip the board as appropriate for optimization.

Upstream of the planer, a board is measured by a scanner and then evaluated by the processing logic of an optimizing processor. Advantageously, each board is scanned and individually optimized because of the fact that every board may have unique defect characteristics, the primary example of which in the present disclosure is wane, although this is not intended to be limiting but merely illustrative of one of many defects which a board may have which will effect optimization for highest value return of the boards exiting the planer.

Figure 2A:
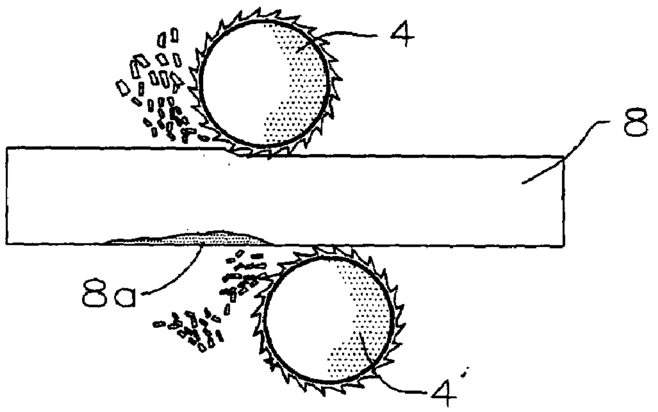
FIG. 2*a* is the depth of cut effect on a board with the wane being substantially missed due to the fixed cutterhead positioning in the planer.
Figure 1:
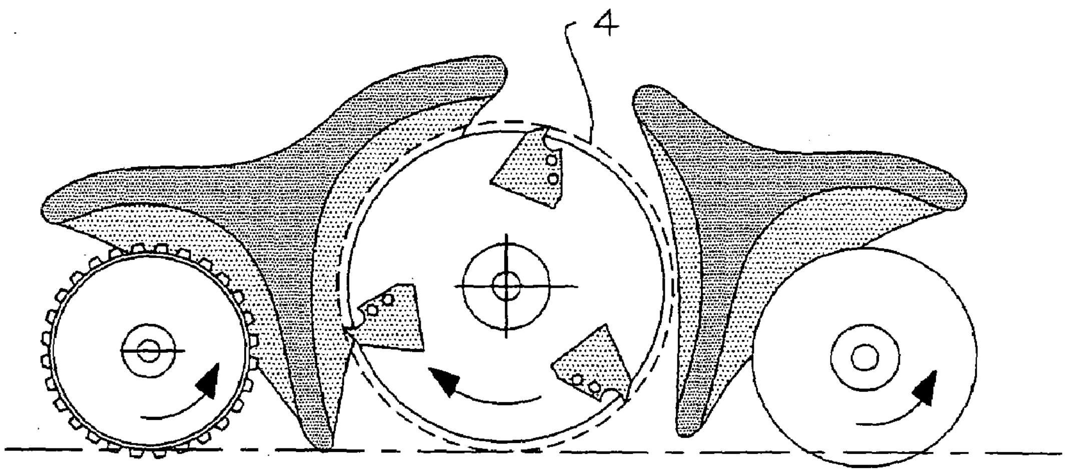
Fig 1 Prior Art
FIG. 1 is a prior art cutterhead.
Figure 1A:
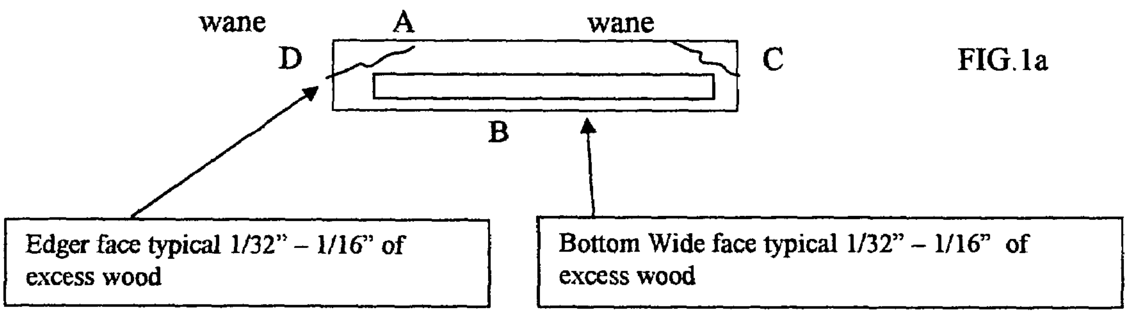
FIG. 1*a* illustrates the example of a 2×4 in cross section and the dimensions to be planed.

The boards entering the planer often will require re-orientation as compared to their orientation entering the scanner due to the fact that conventional planers plane on opposite sides of a board by the use of a fixed position cutter head on one side of the board, and a selectively moveable cutter head positioned on the opposite side of the board. A prior art cutter head is illustrated in side elevation view in FIG. 1. FIG. 2*a* illustrates a board 8 translating through a planer, such as planers 6 seen in FIGS. 3, 5 and 7, between oppositely disposed cutter heads 4 and 4' so as to reduce the thickness of the board to a target size. In FIG. 2*a*, board 8 is oriented so that wane 8*a* is on the side of the board being planed by the fixed position cutter head 4'. In FIG. 2*b*, board 8 has been flipped so that wane 8*a* is being planed by the actively moveable cutter head 4. The result then is that in the orientation of FIG. 2*b* more of the wane defect is removed because in the planer the actively moveable cutterhead 4 may be cut deeper into the board if oversized, than the fixed position cutterhead 4 as better explained below.

Figure 6A:
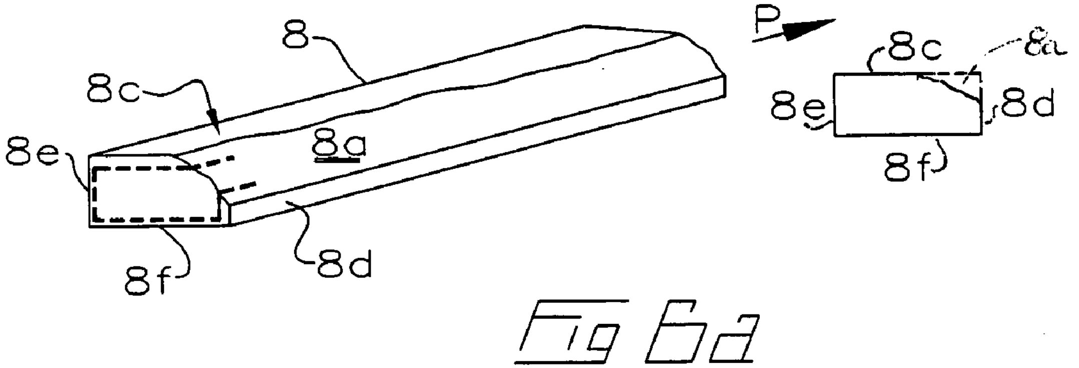
FIGS. 6*a*–6*d* are examples of desired orienting of a board for planing a wane defect on the board.
Figure 6B:
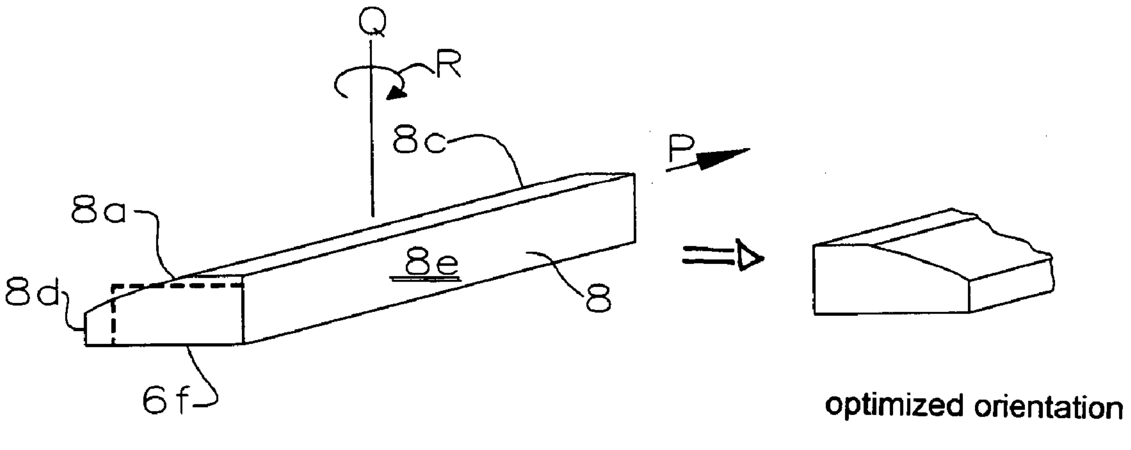

In conventional planers, in order to optimize the orientation of a board being planed, it is not merely, depending on the target size as better described below, desirable to orient wane towards one or the other of an oppositely disposed pair of cutter heads 4 and 4', but also to orient the defect towards one lateral side of the planer as opposed to orienting it towards the opposite lateral side. Thus, as seen in FIGS. 6*a*–6*d*, the board 8 of FIG. 6*a* having wane extending along the board between surface 8*c*, being the top surface of the board, and surface 8*d*, being the right side surface of the board, for a board traveling in direction P through planer 6, would not require to be re-oriented in order to achieve an optimized removal of wane 8*a*. However in the orientation of FIG. 6*b* where wane 8*a* is now to the left, the board would be turned end-for-end, that is, turned through one hundred eighty degrees about a vertical axis of rotation Q (in direction R for example), in order to optimize the board for processing in direction P through planer 6 to achieve the optimized board recovery. The desired orientation of FIG. 6*a* is shown as having been achieved to the right in FIG. 6*b*, that is, after board 8 has been turned.

Figure 6C:
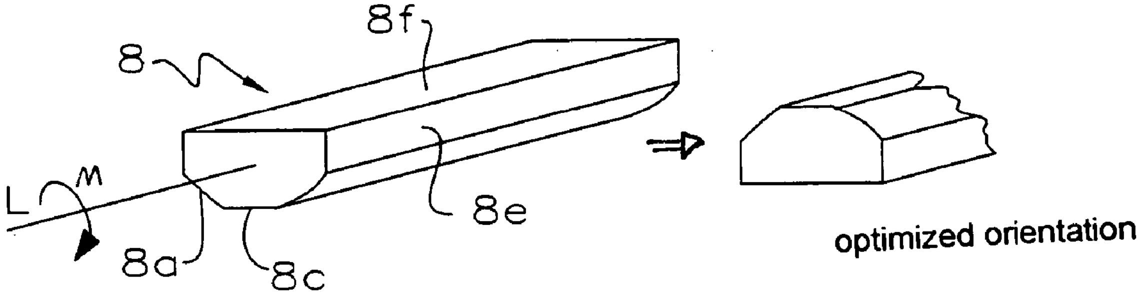
Figure 6D:
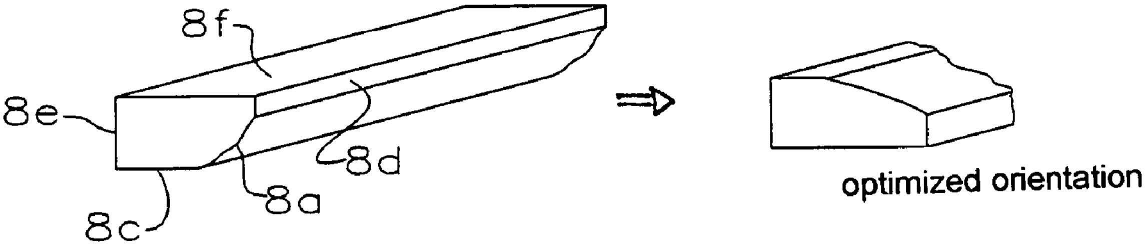

In the orientation of FIG. 6*c*, board 8 is inverted from the optimized orientation of FIG. 6*a*. Consequently, board 8 has to be flipped over, that is rotated one hundred eighty degrees about its longitudinal axis L (in direction M for example), in order to achieve the orientation of FIG. 6*a*. The optimized orientation of FIG. 6*a* is shown as being achieved to the right in FIG. 6*c*. Similarly, with board 8 oriented as shown to the left in FIG. 6*d*, board 8 requires both flipping and turning in order to orient the board into the optimized orientation of FIG. 6*a*, as shown to the right in FIG. 6*d*.

Thus it may be seen that once a board is scanned so that its measurements are known, a optimizing processor may determine from those measurements whether the board needs to be re-oriented or not prior to entry into a planer. Consequently, depending on the defects a particular planermill is configured to optimize for, a planermill may have the arrangements depicted by way of example in FIGS. 3, 5 and 7.

Figure 3:
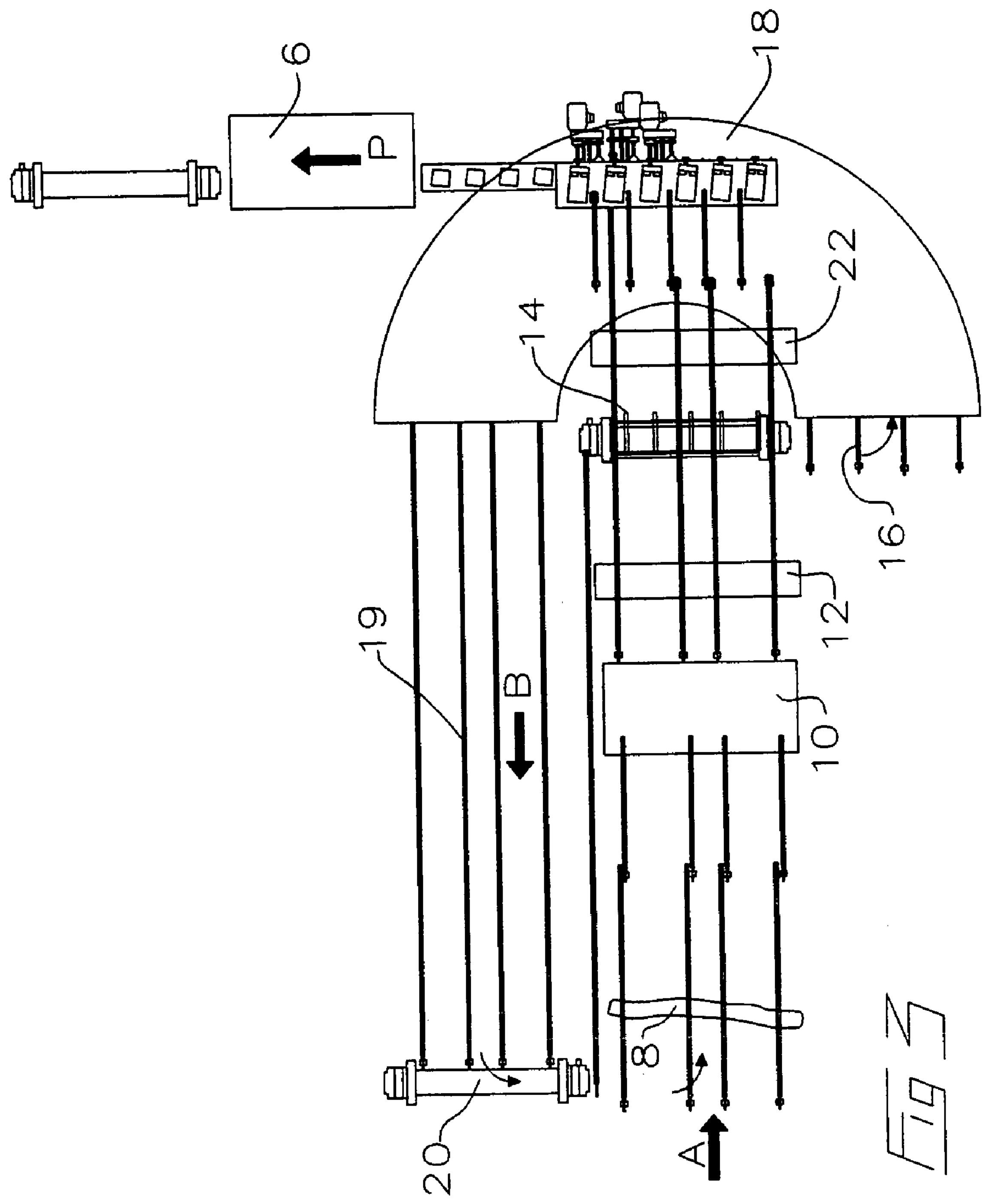
FIG. 3 is the material handling equipment required to flip, turn, flip and turn lumber for optimal orientation.

In FIG. 3, lumber pieces, such as boards 8, are presented to the system as a single layer deck of wood which is passed in flow direction A to lug loader 10. The lug loader, an example of which is described in U.S. Pat. No. 4,869,360, singulates the boards and loads them onto a transfer for processing through the transverse scanner 12. The scanner provides information to an optimizing processor which makes a decision for example according to the logic of FIGS. 4*a*–4*b* and FIGS. 9, 9*a*–9*h*. The board is then processed. If the board requires turning end for end, it is dropped out at gate 14 onto landing table 16 and then turned by transfer 18. The board is then returned in direction B on return transfer 19 and reinserted into the flow A by belt 20 with the ends swapped. If the decision requires flipping, the board is flipped by board turner 22. The ability to end match the boards for minimal change to planer sets is accomplished by storing the boards in variable length turn transfer 18.

Figure 8A:
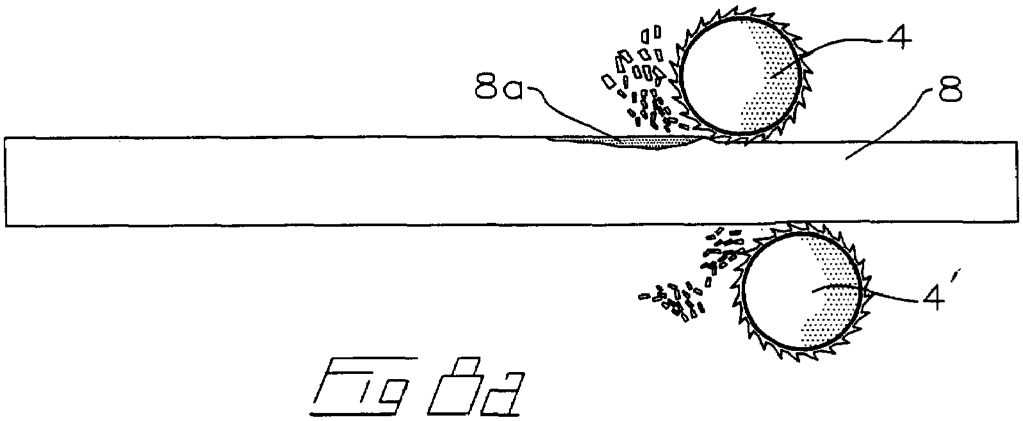
FIGS. 8*a* and 8*b* are face-wane defect removal examples for scant and non-scant thickness boards.
Figure 8B:
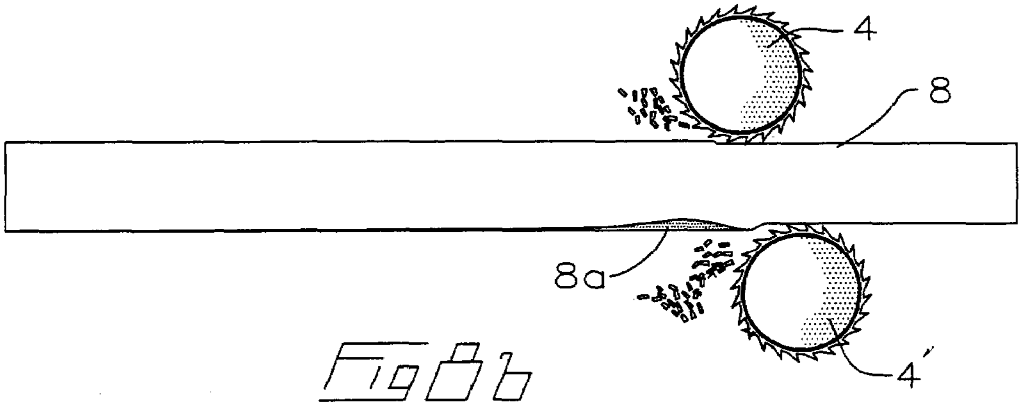
Figure 9:
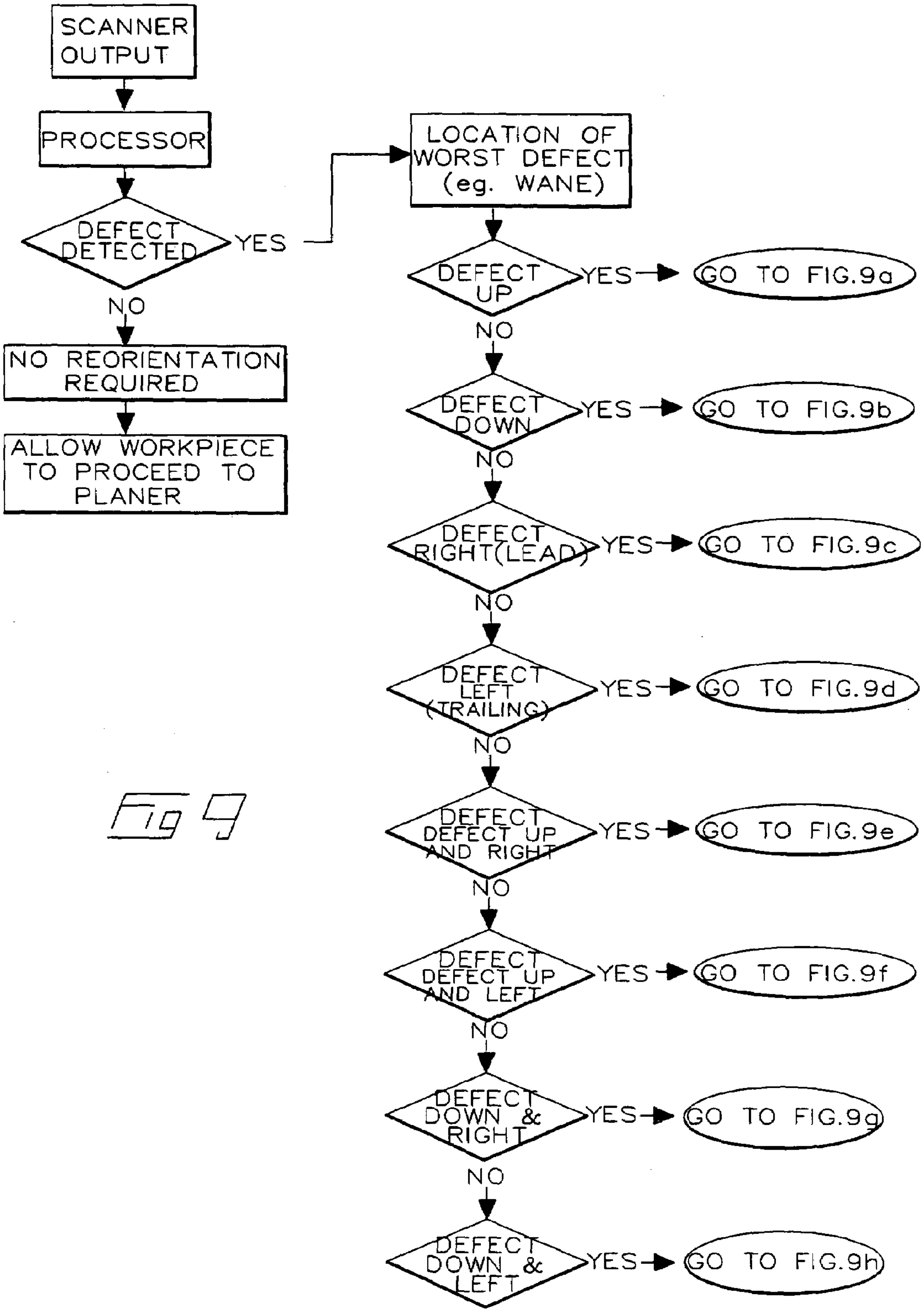
FIGS. 9, 9*a*–9*h* illustrate the logic flow for one example of the logic set out in FIGS. 4*a* and 4*b*.
Figure 9A:
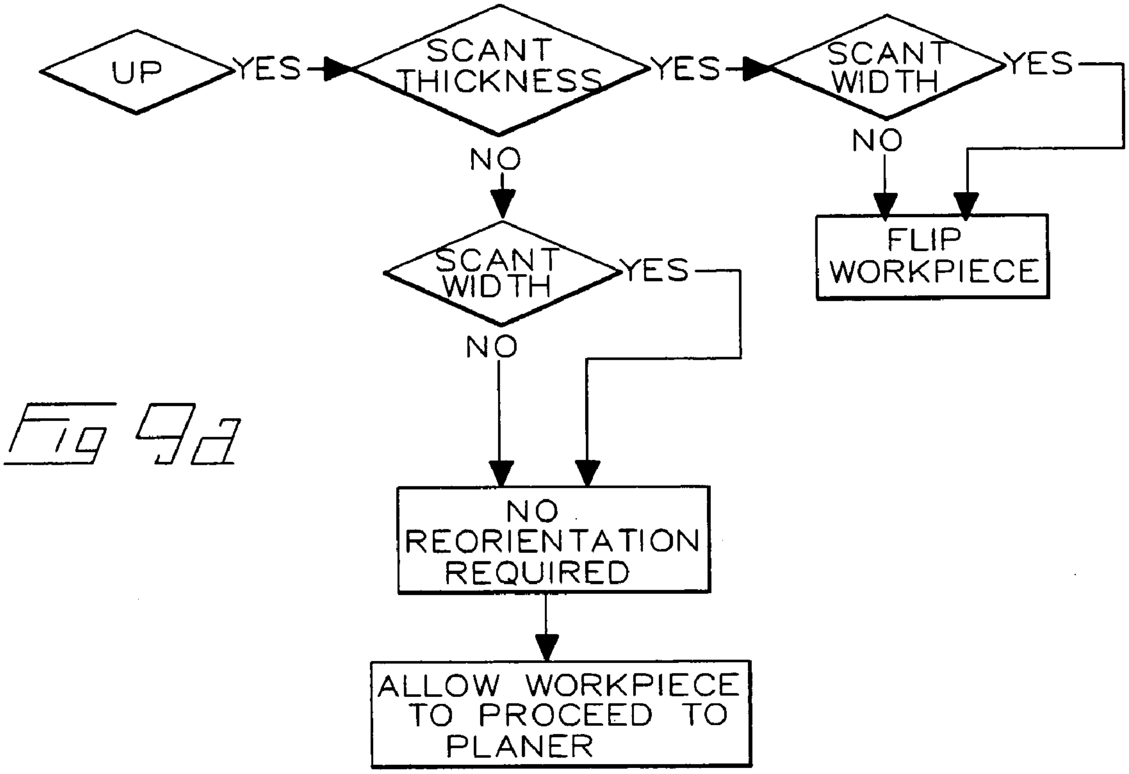
Figure 9B:
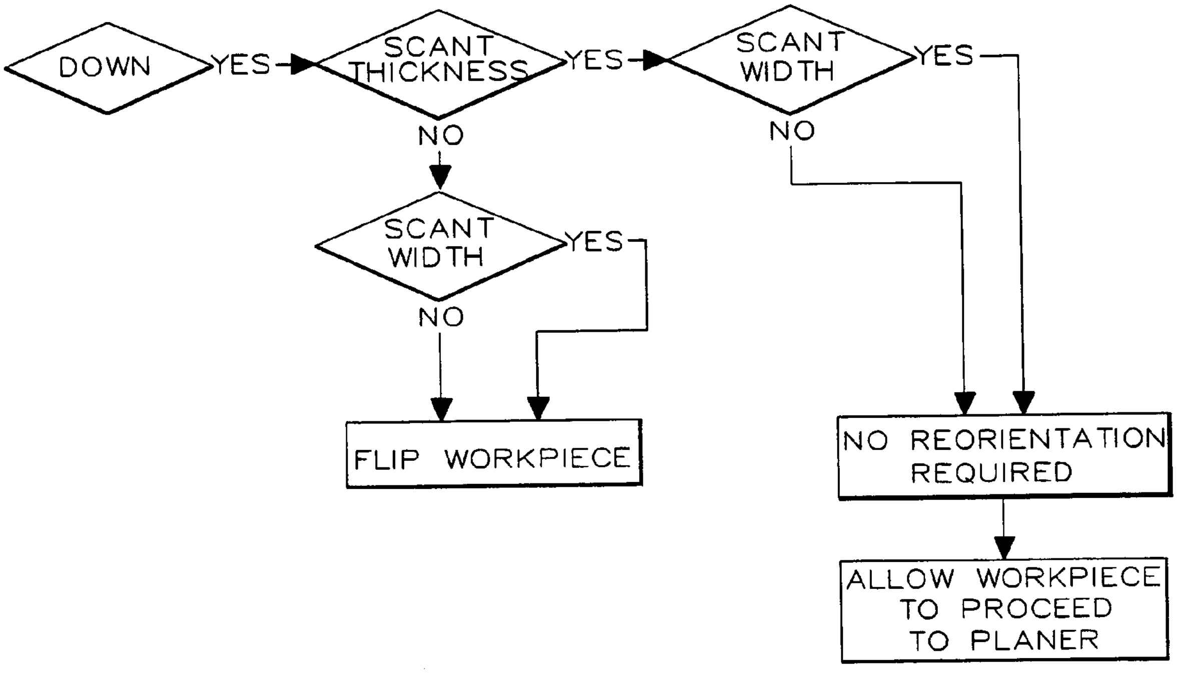
Figure 9C:
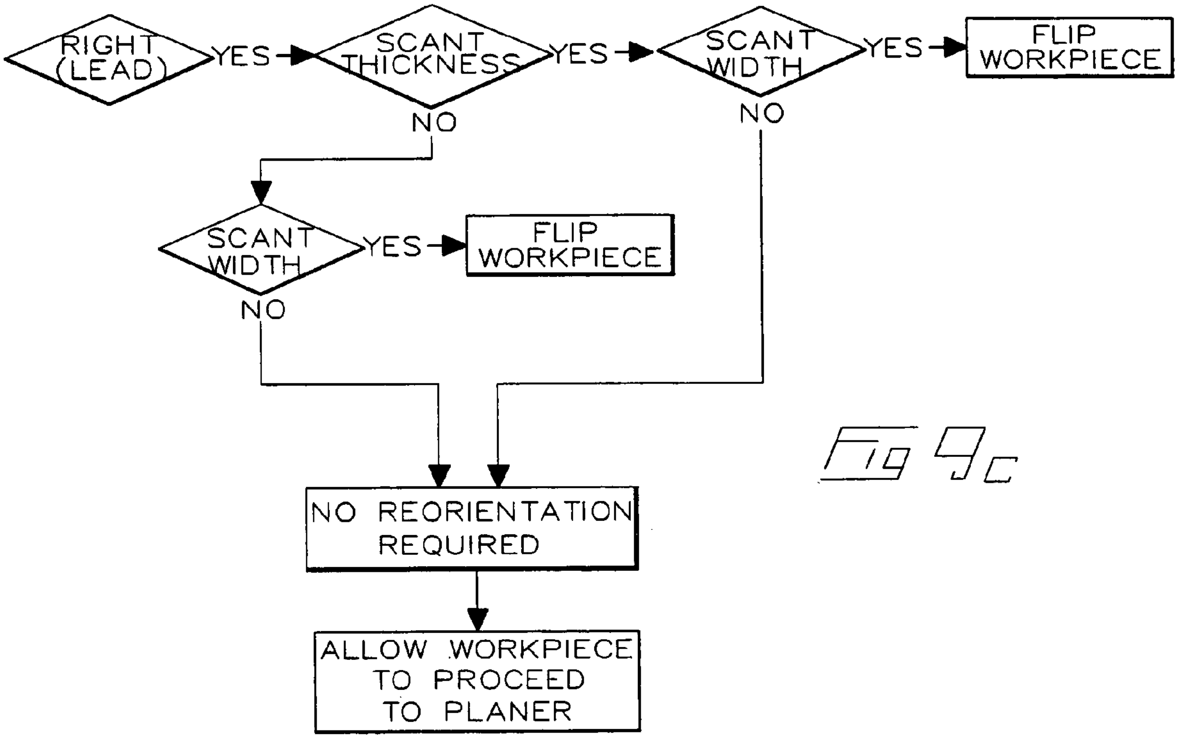
Figure 9D:
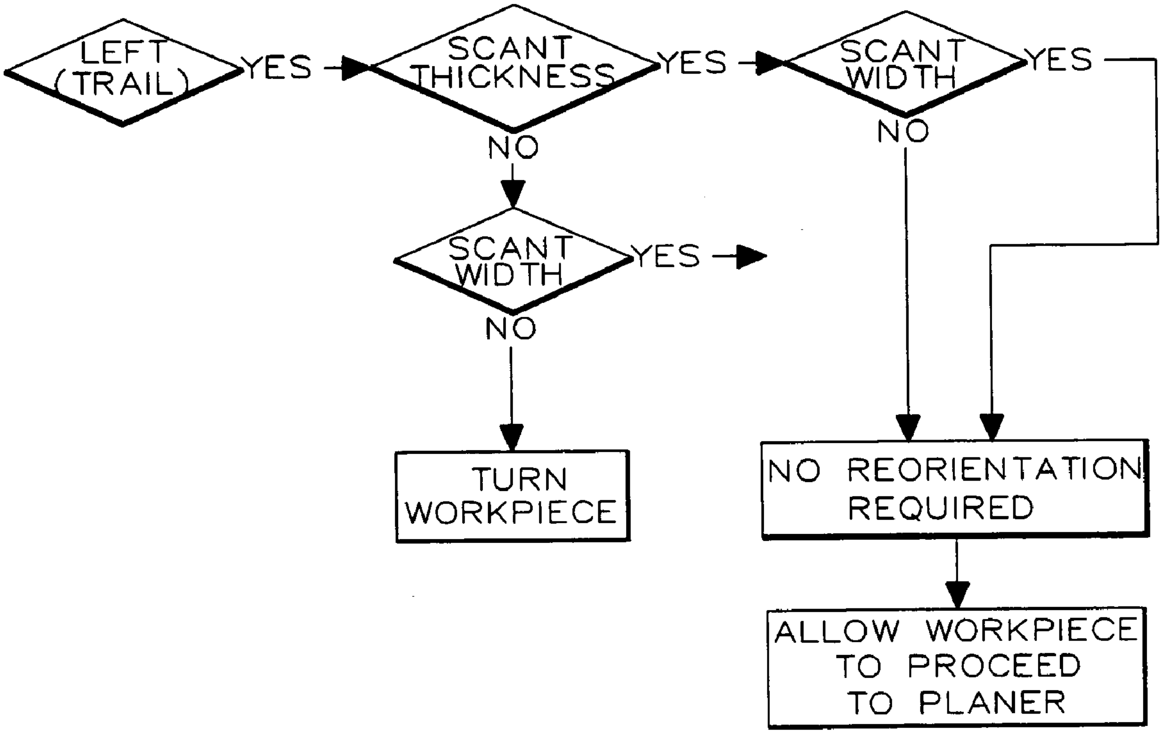
Figure 9E:
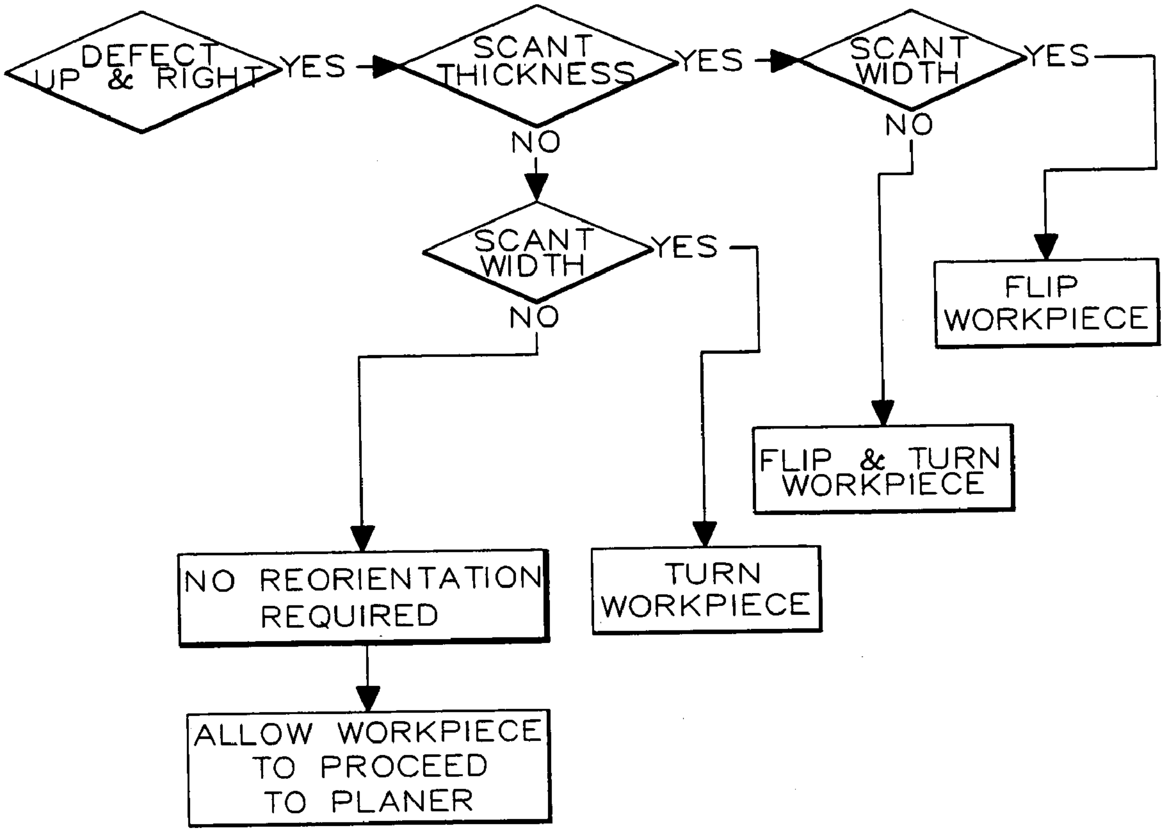
Figure 9F:
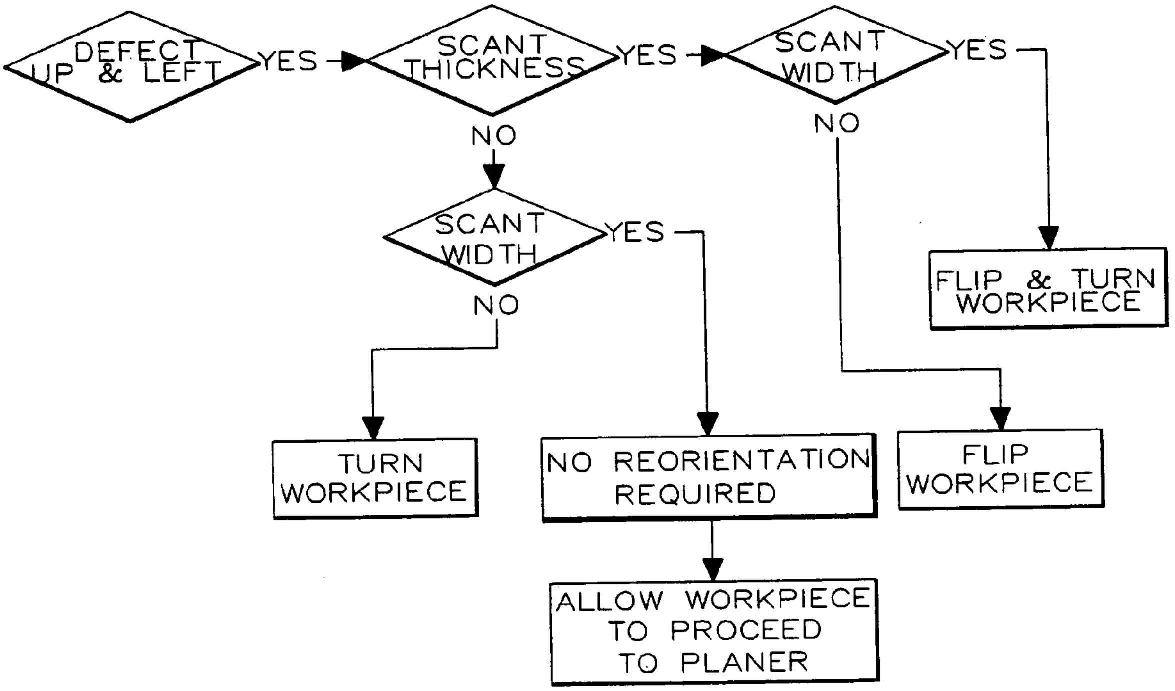
Figure 9G:
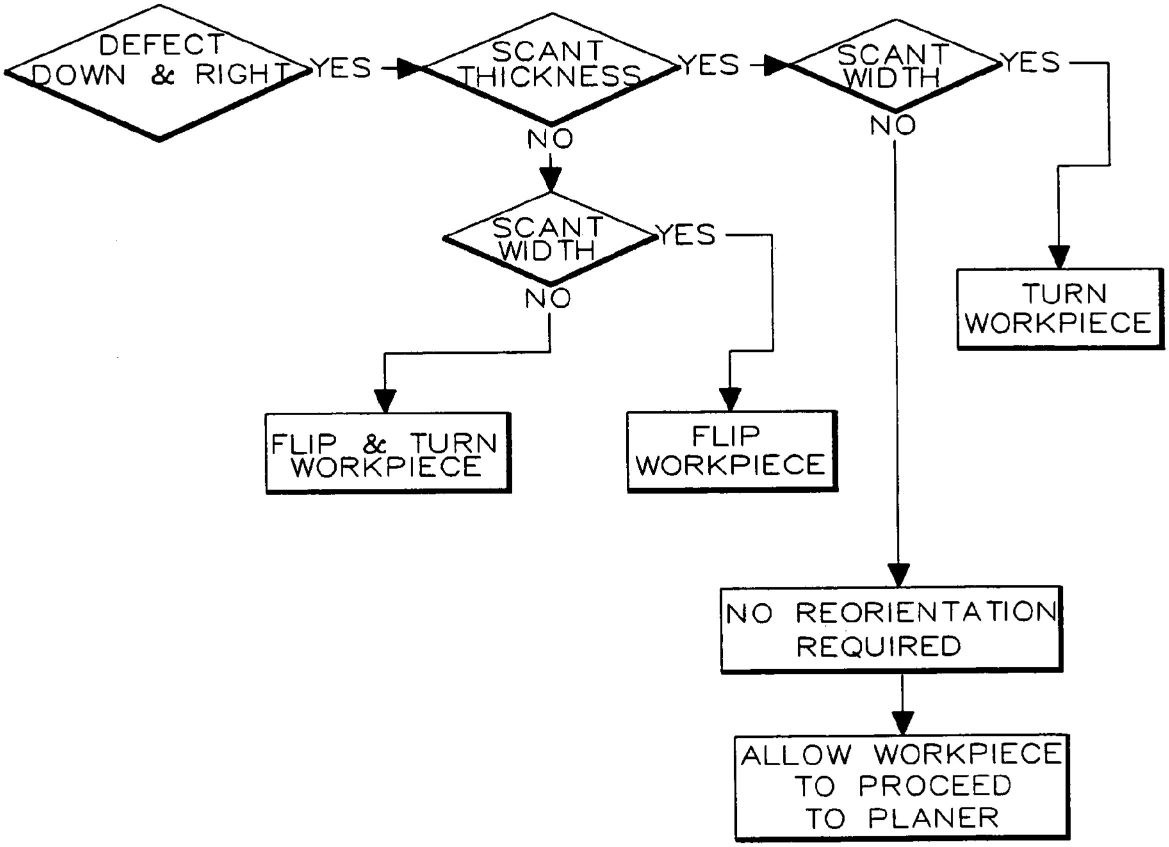
Figure 9H:
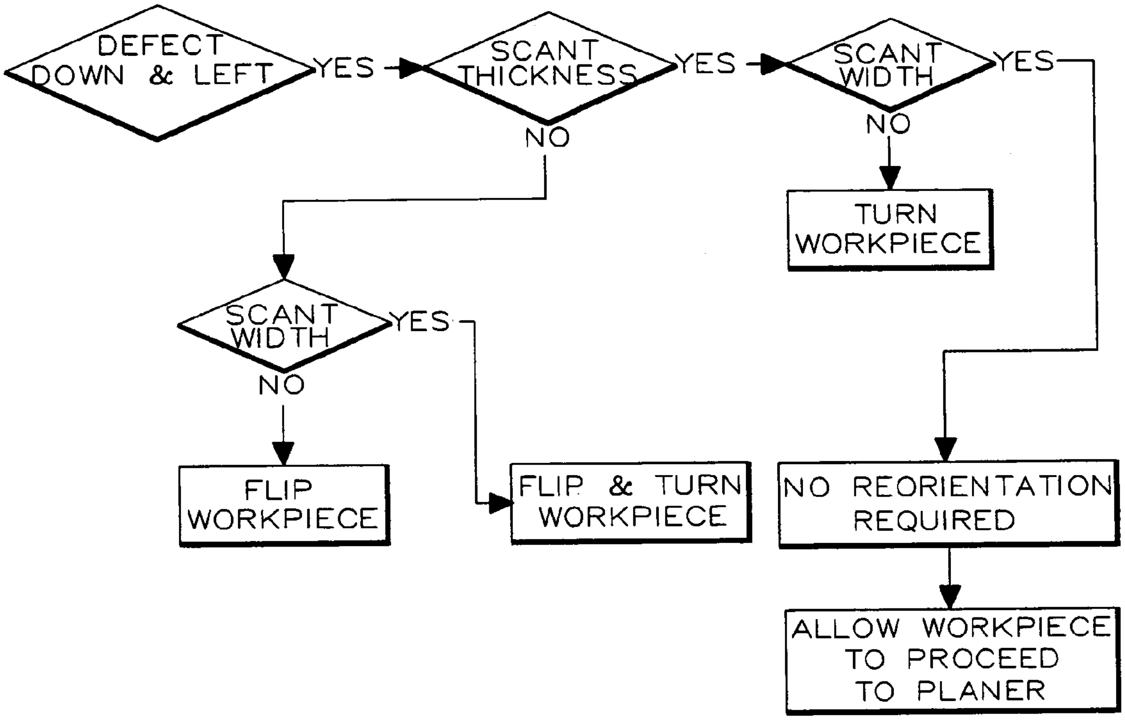

The wood quality, as chosen in accordance with the set-up logic of FIGS. 4*a*–4*b* will indicate the quality that will be analyzed first when performing 'best' orientation. The remaining quality will be utilized for further positioning quality analysis in 'don't care' situations of the preferred quality analysis. Any preference will take precedence over any other face/edge in all orientation situations. When preference as to the wide face over the narrow, that is edge face, is not stated, the optimizer optimizes for comparing the amount or percent of wane on both edge and face. Thus in the board thickness example illustrated in FIGS. 8*a* and 8*b*, if the board thickness entering the planer is equal to or greater than the desired target thickness of the board once planed plus the minimum thickness which will be removed on both the top and bottom surfaces of the board (referred to above as oversized), then the optimizer will select the moveable cutter head 4 side of the board (the top side in the example) for the greatest depth of cut and orient the face wane to that side, that is, up in the example of FIG. 8*a*. In this fashion the most face wane is removed, as compared to the use of the fixed cutter head 4' to remove the face wane. In the example of FIG. 8*b*, the board thickness is referred to as scant, that is less than the sum of the target thickness plus the two (top and bottom) minimum thicknesses of cut by the cutter heads. In this instance then the optimizer orients the face wane to the fixed depth-of-cut cutter head 4', that is, down in the example of FIG. 8*b*, as the moveable cutter head 4 will be removing less than the cut thickness of the fixed depth-of-cut cutter head 4'. Similar logic is applied when factoring in edge wane.

The logic description of FIGS. 4*a* and 4*b* presented above represent only wane defect scenarios while the invention covers other arrangements and orientations of the boards to accomplish an optimized end result, for example for defects in the boards such as: knots, holes, crook, bow, splits, grain, scant thickness, scant width and in addition provides for “trim block” recovery, all of which are intended to be within the ambit and scope of the present invention.

Figure 5:
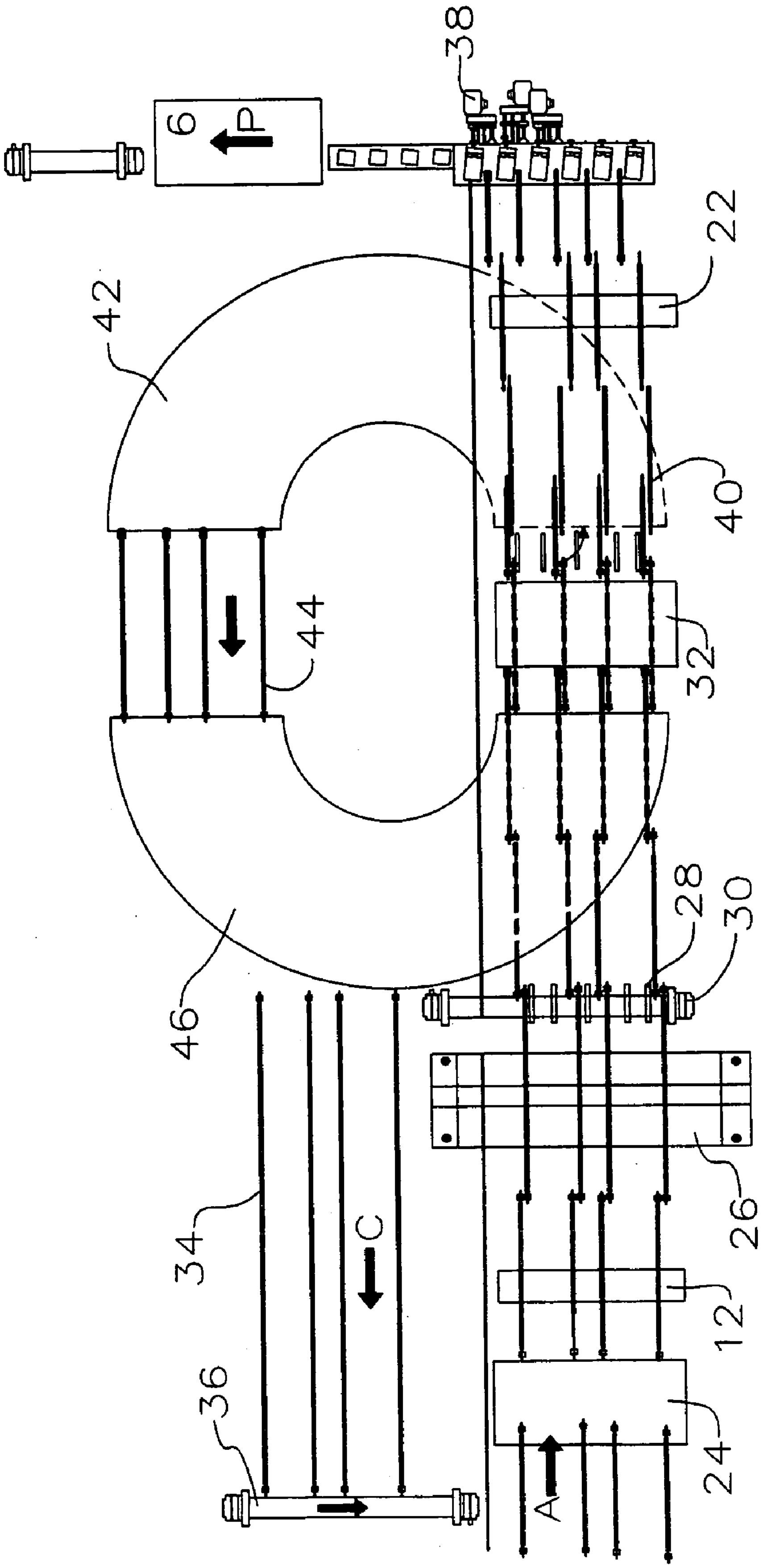
FIG. 5 is a planer mill layout which incorporates all of the recovery options including wane orientation, trim block recovery, batch storage of problem pieces, and end matching.

In the exemplary arrangement of FIG. 5, boards 8 are translated in flow direction A across lug loader 24 which loads the boards onto a scanner conveyor so as to convey the boards transversely through scanner 12. Once scanned, boards 8 enter trimmer 26 for optimized trimming of ends of the boards as required. Trim blocks may be recovered at this station. Downstream of trimmer 26, a reject dropout gate 28 may be actuated according to a processor decision to remove a substandard board or a board not requiring immediate planing or one for storage for later planing so as to drop the board onto a reject belt 30 for ejection of the board transversely to the direction of flow A.

Boards which are not rejected continue downstream to upper lug loader 32. Rejected boards may be transferred to reject storage table 34 for translation in direction C onto reject return belt 36 whereupon the boards may be returned transversely to the conveyor feeding lower lug loader 24 if for example re-scanning of the boards is required. Those boards flowing downstream onto lug loader 32 may, if no re-orientation in order to optimize the orientation of a particular board is required, pass on downstream onto the planer infeed 38 for translation in flow direction P through planer 6.

If a board is to be rejected as requiring planer 6 to be re-set and it is desired to run such rejected boards at a later time in a batch process once the planer has been re-set, the rejected boards may be stored in a holding pattern by the use of lower drop-out gate and decline 40 to direct the boards onto lower one hundred eighty degree lugged turn conveyor 42. In such a holding pattern, boards may also be conveyed along lugged incline 44 so as to be stored on upper one hundred eighty degree smooth turn conveyor 46. Boards which are to proceed to planer 6, flow downstream past automatic board turner 22. Although missing from FIGS. 5 and 7, it is understood that a board turn transfer 18 such as illustrated in FIG. 3*a* would also advantageously be included prior to a board being transferred onto planer infeed 38 so that if optimization required that a board be turned one hundred eighty degrees, as described above with respect to FIG. 3*a*, the board would be diverted by a drop-out 14 onto a landing table 16 and then turned on turn transfer 18 so as to be returned along a lumber return transfer 19 to a return belt 20 for insertion upstream of scanner 12.

Figure 7:
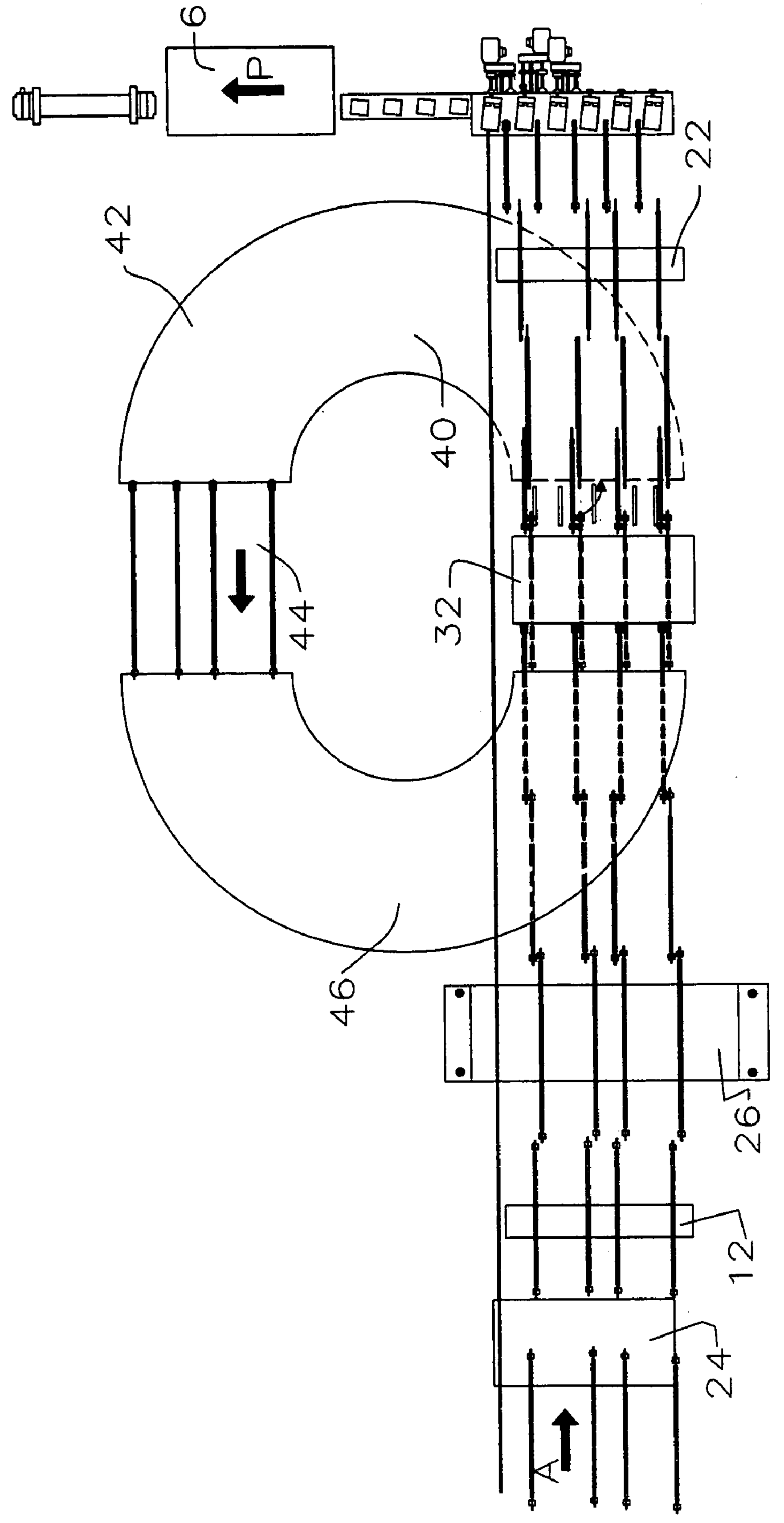
FIG. 7 shows a planer mill layout with the measure, optimize, flip, turn, and store for end match capability.

FIG. 7 merely illustrates a simplified arrangement from that of FIG. 5 in which drop-out gate 28 and reject belt 30 so as to return rejected pieces on reject storage table 34 for re-insertion by return belt 36 upstream of scanner 12 is not provided.

The “optimum” orientation of the boards feeding into the planer is determined by measuring the lumber in either a transverse or linear scanner 12, or other defect detector, and then processing the result and optimizing to an optimized orientation according to the logic set out by way of a limited example in FIGS. 4*a* and 4*b* and the corresponding logic flow chart of FIGS. 9, 9*a*–9*h*. Again, the logic of FIGS. 4*a* and 4*b* is exemplary of a wane defect, but the scope of the present invention is not so limited. FIGS. 4*a* and 4*b* show the various possibilities for location of the lumber wane defects on the boards. The decision tree gives the resulting optimal orientation of the scanned board. The rectangular icons presented in the logic tables of FIGS. 4*a* and 4*b*, and FIGS. 10*a*–10*h*, graphically represent (with darkened edges) the location of a defect such as wane defect on the board. The Optimizer may also be set up to handle any of the following Planer Machine configurations including the infeed equipment such as flippers and turners and storage of pieces to be dropped into the queue when end conditions match up:

Bottom cutterhead has fixed fiber removal=Yes (Default is Yes, & greyed); Bottom cutterhead Default is 0.030"; range is 0" to 1" Top cutterhead has fixed fiber removal=No (Default is No, & greyed);

Top cutterhead Default is 1"; range is 0" to 1"

Lead edge cutterhead has fixed fiber removal=Yes/No (Default is Yes); if Yes, then Lead edge cutterhead Default is 0.030"; range is 0" to 1"

Trail edge cutterhead has fixed fiber removal=Yes/No (Default is No); if No, then Trail edge cutterhead Default is 1"; range is 0" to 1"

Boards allowed in the storage deck.

The board flipper is active to flip desired boards.

The board turner is active to turn desired boards.

A logic table which is expanded compared to the more limited logic table in the example of FIGS. 4*a* and 4*b* is set out in the logic table of FIGS. 10*a*–10*h*. In the logic tables, the term Flip means forcing the wide face that is currently up, to a down orientation by one hundred eighty degree rotation of the board about axis L. The term Turn means forcing the swapping the orientation of the ends of the piece by one hundred eighty degree rotation of the board about axis Q.

Fiber Removal occurs when a cutterhead is intended to remove an amount of fiber from the face presented to it. One wide face and one narrow face are presented to certain cutterheads (termed ‘inside’) for a fixed amount of fiber removal. Consequently there can never be more than this amount removed from the ‘inside’ faces. The remainder of fibre removal is intended for the opposite face and edge (termed ‘outside’). Thus, when target sizes are large, the ‘outside’ cutterheads typically remove more fiber than ‘inside’ cutterheads, and when target sizes are small, the ‘outside’ cutterheads typically remove less fiber than ‘inside’ cutterheads.

The scanner lumberline (“LL”) is oriented in planer feed direction, or opposite to planer feed direction. Specific face quality rating outputs are allowed for any of the feed orientations, and are provided for in the logic of FIGS. 4*a* and 4*b*, of which one example is illustrated diagrammatically in the logic flow chart of FIGS. 9, 9*a*–9*h*. FIGS. 9, 9*a*–9*h* illustrate the examples where, as set out in FIGS. 4*a* and 4*b*, the scanner NLL (near lumber line) is first end to the planer and the inner cutterheads are left and bottom, or the scanner LL (lumber line) is first end to the planer and the inner cutterheads are right and bottom.

The logic description of FIGS. 4*a* and 4*b* presented above represent only wane defect scenarios while the invention covers other arrangements and orientations of the boards to accomplish an optimized end result, for example for defects in the boards such as: knots, holes, crook, bow, splits, grain, scant thickness, scant width and in addition provides for "trim block" recovery, all of which are intended to be within the ambit and scope of the present invention.

Figure 10A:
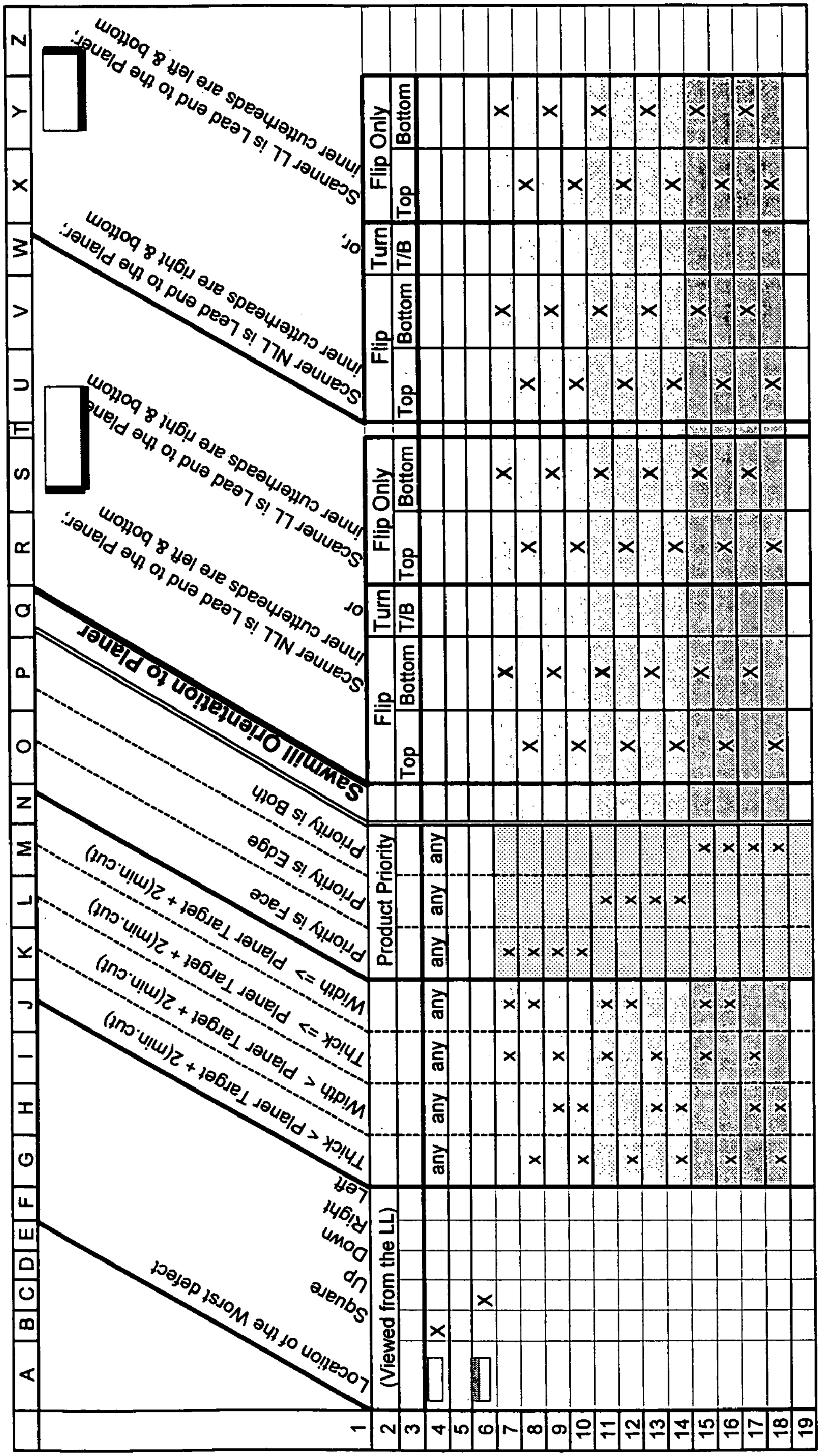
FIGS. 10*a*–10*h* are a tabular representation of the decision logic required to orient boards for optimal planing based on the location of a board defect for different priority weighting as between face, edge or both.
Figure 10B:
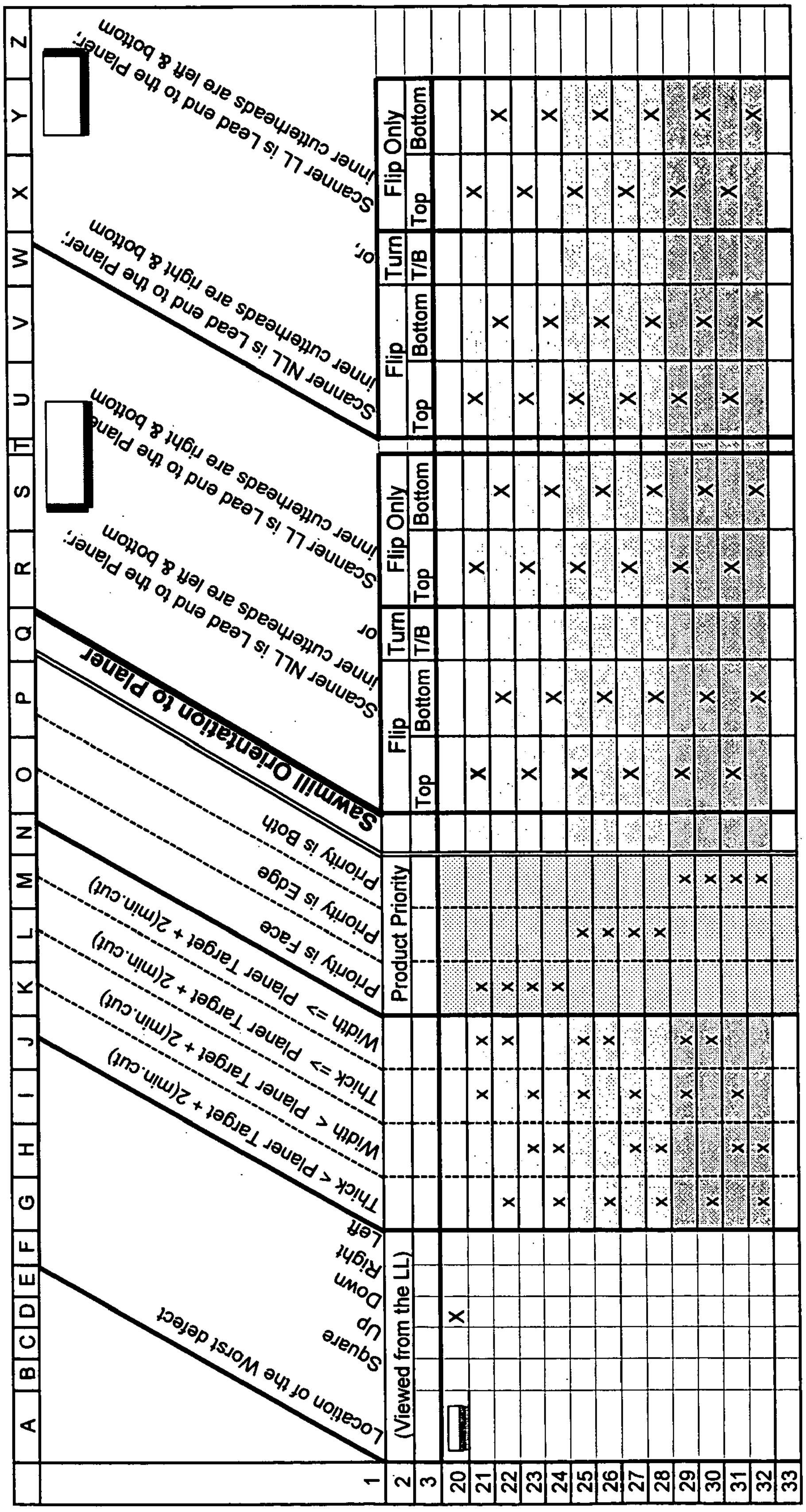
Figure 10C:
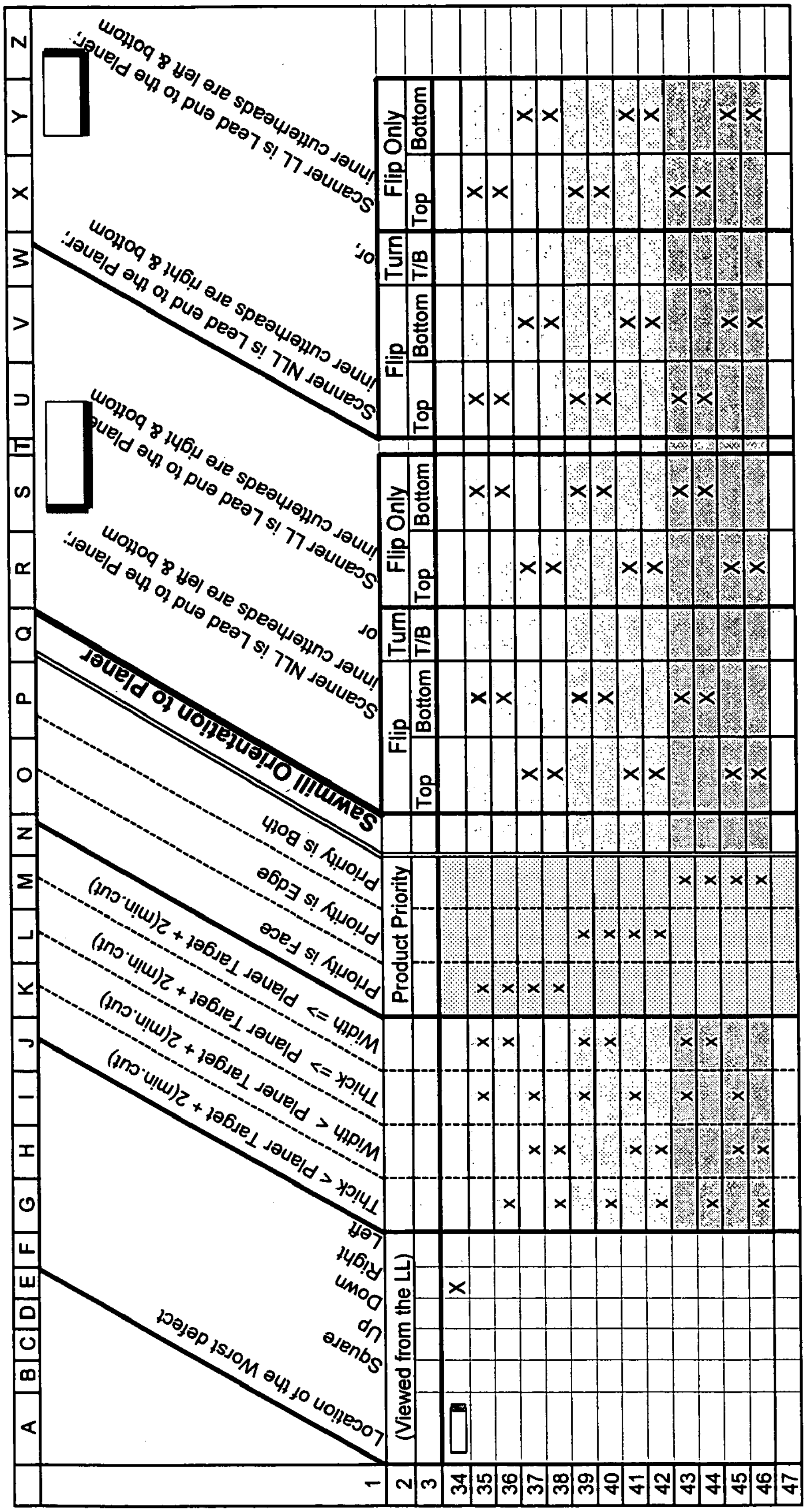
Figure 10D:
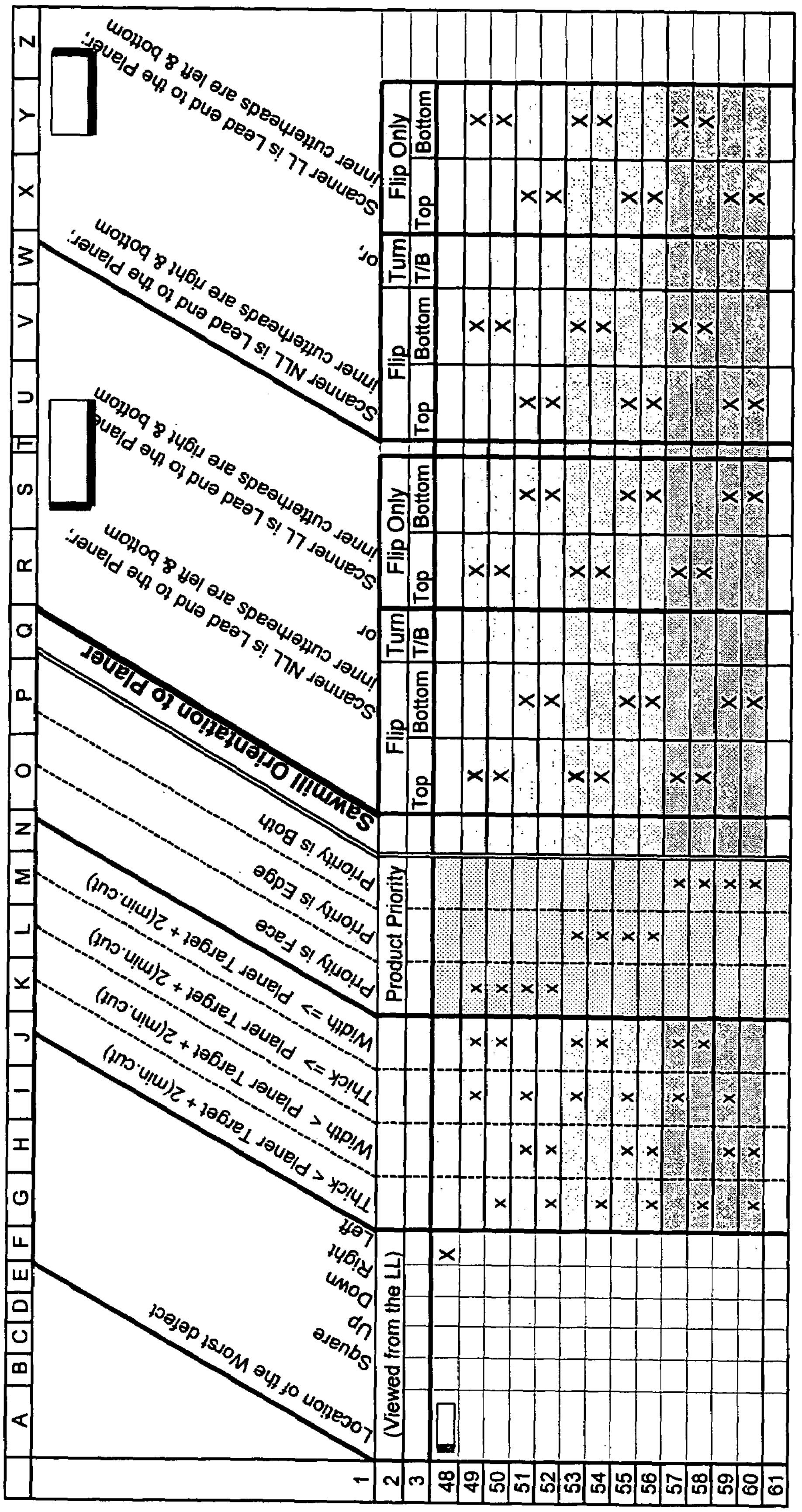
Figure 10E:
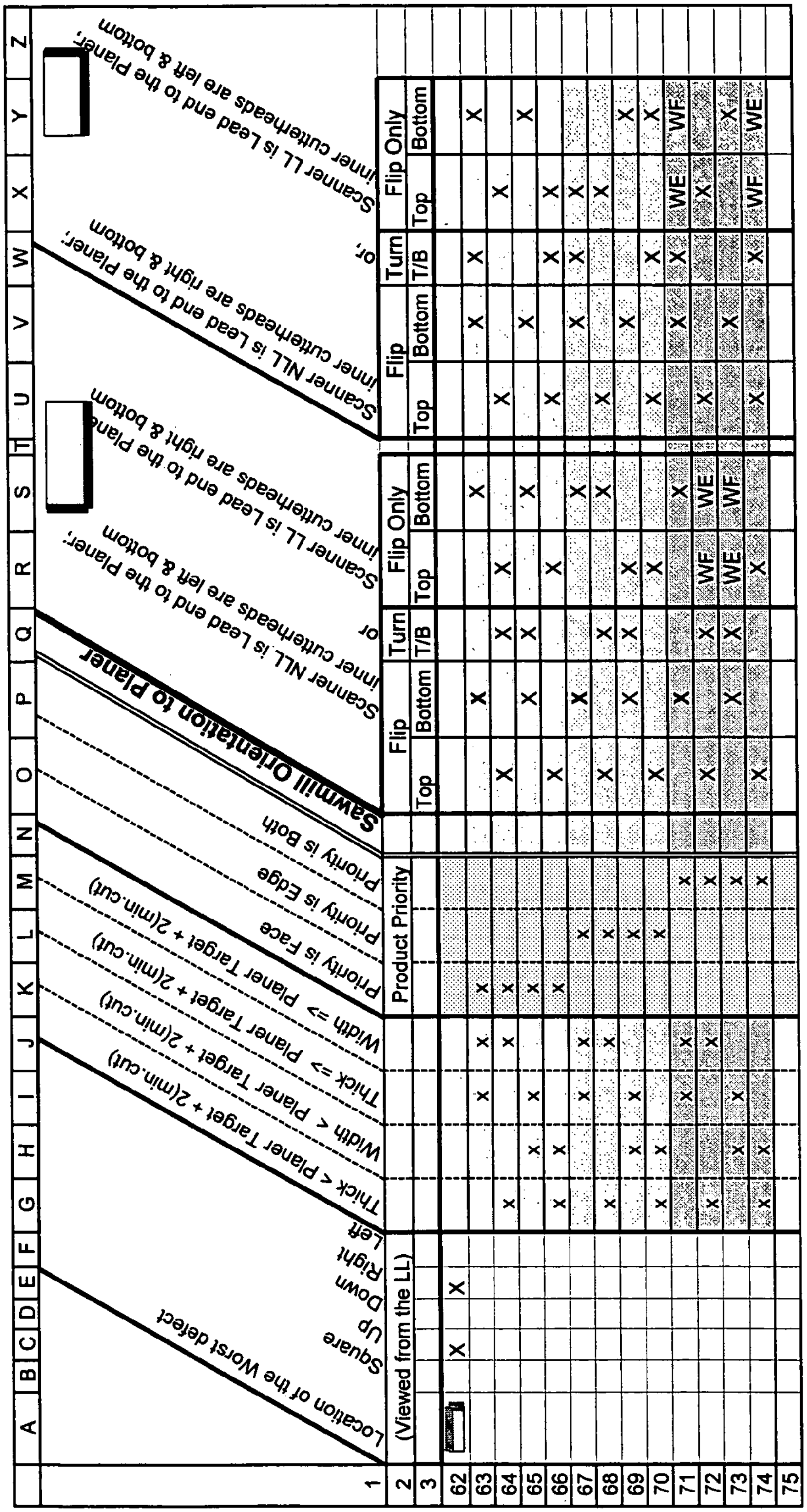
Figure 10F:
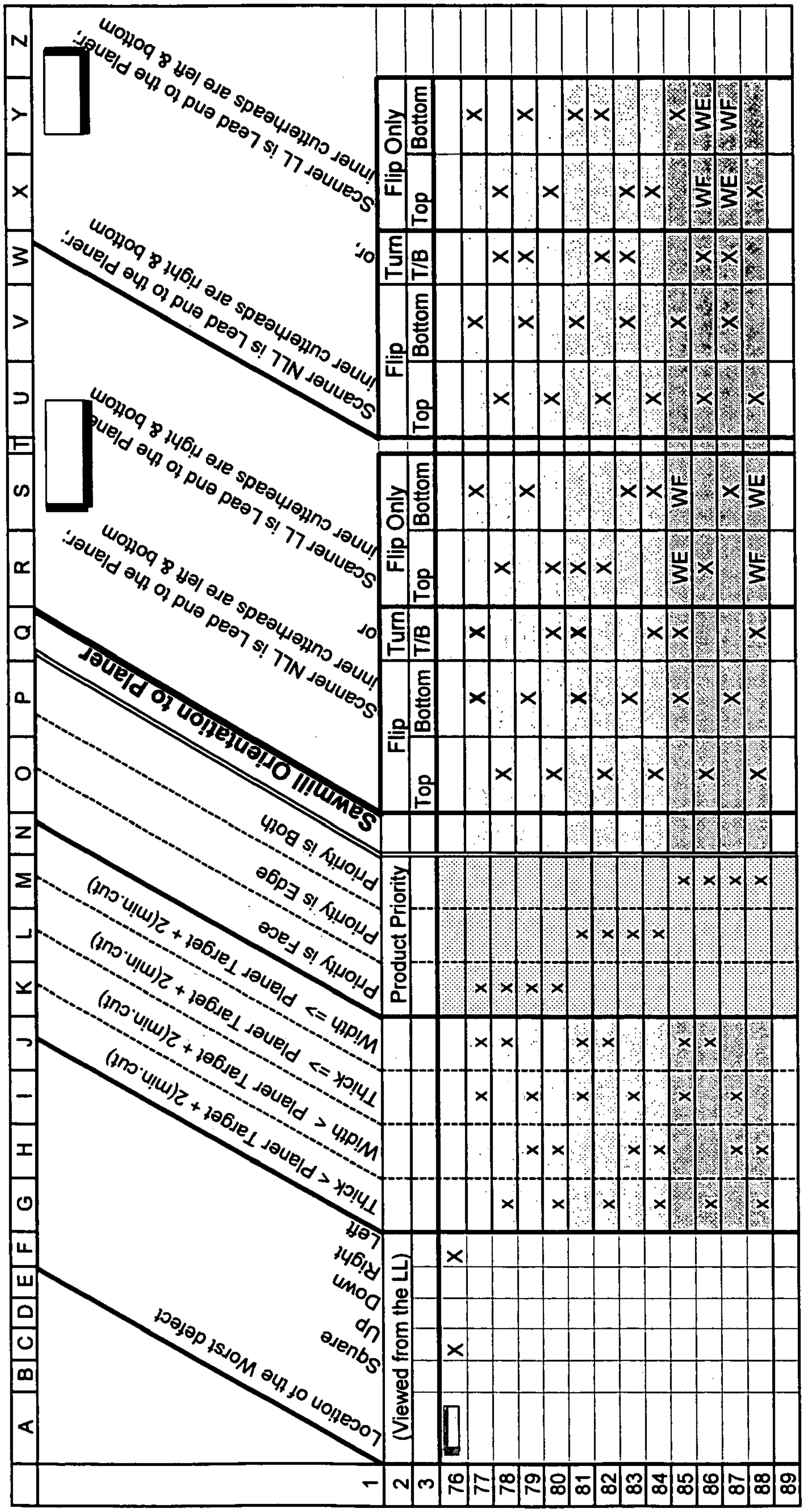
Figure 10G:
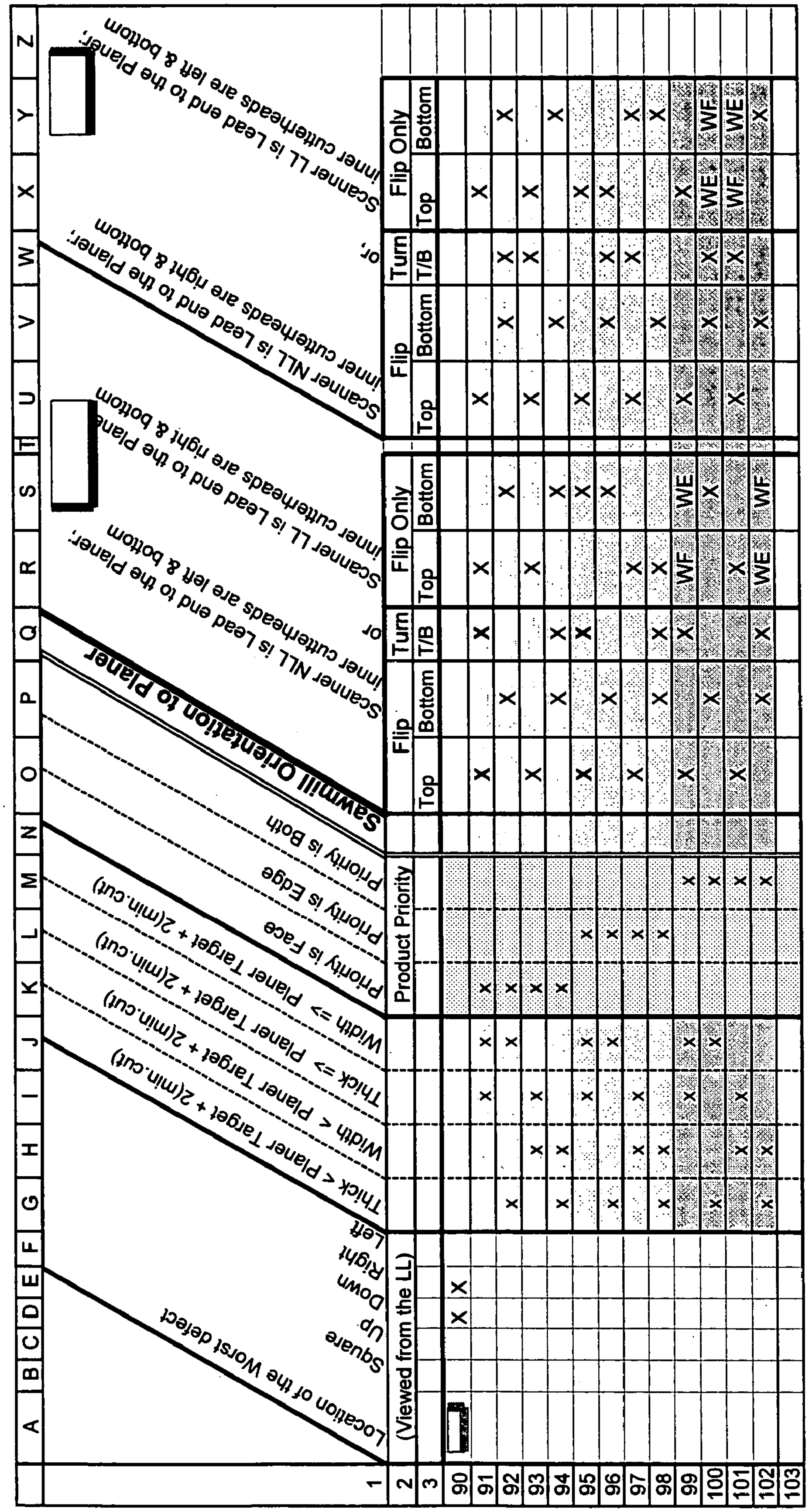
Figure 10H:
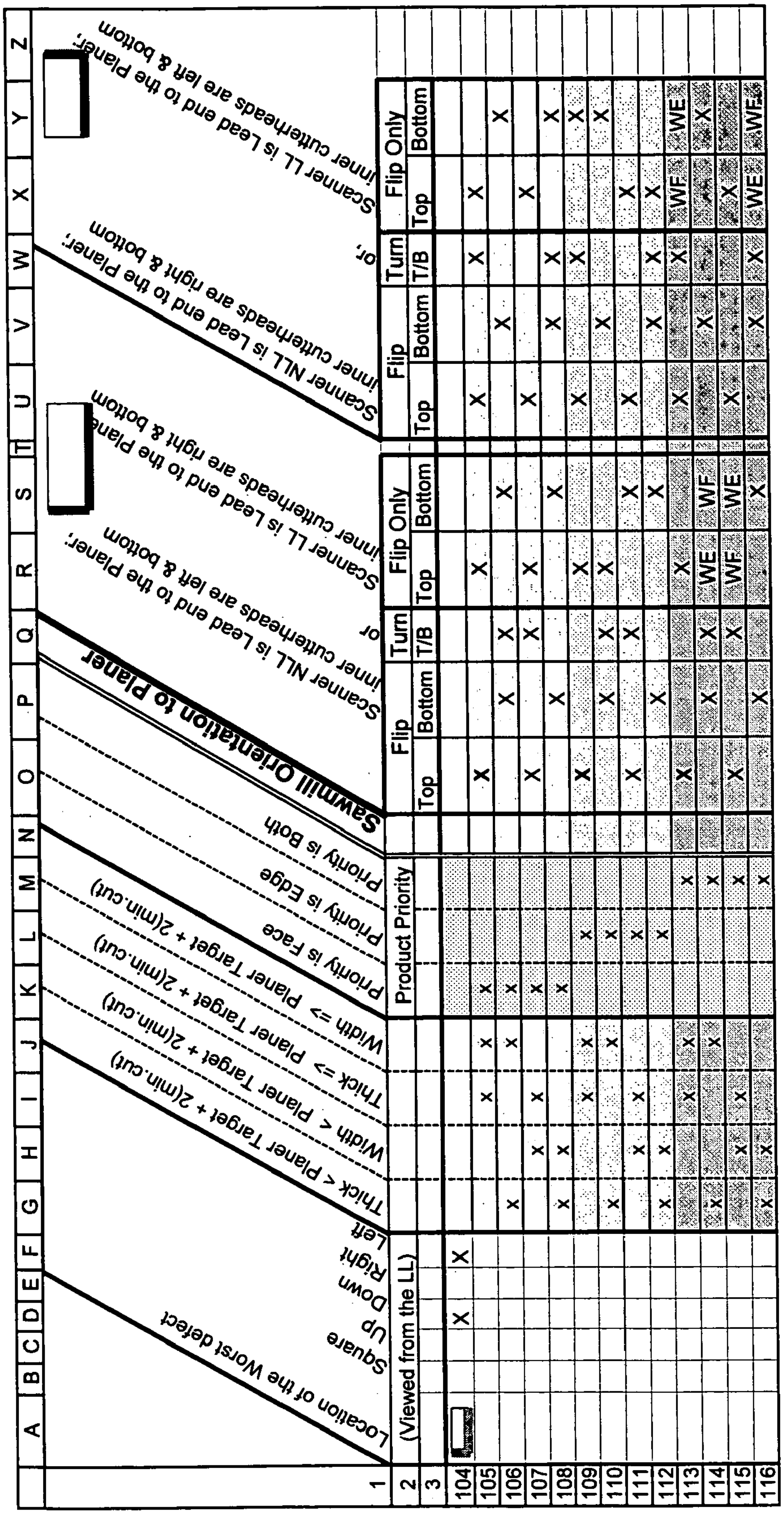

Thus, as relating to the logic tables of FIGS. 10*a*–10), the table of FIG. 11 represents examples of decisions made by the optimizer in a given scenario, wherein the cell reference is firstly to the corresponding column in the table (e.g. column "X" or "Y") and secondly to the corresponding row in the table (e.g. row "110").

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. In an apparatus for optimizing orientation of a workpiece in a planermill for feeding into a planer having:

a) a selectively actuable first cutterhead adjacent a first wide surface of the workpiece when in the planer, wherein the selectively actuable first cutterhead is selectively actuable so as to selectively adjust a depth of cut of the selectively actuable first cutterhead when planning the workpiece;

b) a fixed depth-of-cut second cutterhead adjacent a second wide surface opposite to said first wide surface;

c) a selectively actuable third cutterhead adjacent a first edge surface of the workpiece, wherein the third cutterhead is selectively actuable to adjust a depth-of-cut of the third cutterhead when planning the workpiece;

d) a fixed depth-of-cut fourth cutterhead adjacent a second edge surface opposite to the first edge surface;

wherein the apparatus includes infeed means to the planer, means for selectively turning the workpiece end-for-end upstream of the planer on the infeed means, and means for selectively flipping the workpiece one hundred eighty degrees about its longitudinal axis upstream of the planer on the infeed means, a method of optimizing orientation of the workpiece for feeding into the planer comprising the steps of:

e) receiving data from a scanner for processing;

f) processing the received data from the scanner to detect and identify the location of the worst defects on the first and second oppositely oriented wide surfaces and on the first and second oppositely oriented edge surfaces of the workpiece;

g) orienting the workpiece by only flipping the workpiece one hundred eighty degrees about its longitudinal axis, when in said processing it is determined that:

(i) a worst defect exists on only the first wide surface of the workpiece and the workpiece has:

a) scant thickness and non-scant width, or b) scant thickness and scant width;

(ii) a worst defect exists on only the second wide surface and the workpiece and the workpiece has:

a) non-scant thickness and non-scant width, or b) non-scant thickness and scant width;

(iii) a worst defect exists on only the first edge surface and the workpiece has:

a) non-scant thickness and scant width, or b) scant thickness and scant width;

(iv) a worst defect exists on only the second edge surface and the workpiece has:

a) non-scant thickness and non-scant width, or b) non-scant thickness and scant width;

(v) worst defects exist on only the first wide surface and the first edge surface, and the workpiece has scant thickness and scant width;

(vi) worst defects exist on only the first wide surface and the second edge surface, and the workpiece has scant thickness and non-scant width;

(vii) worst defects exist on only the second wide surface and the first edge surface, and the workpiece has non-scant thickness and scant width; or (viii) worst defects exist on only the second wide surface and the second edge surface, and the workpiece has non-scant thickness and non-scant width;

h) orienting the workpiece by only turning the workpiece one hundred eighty degrees about an axis generally orthogonal to the wide surfaces so as to turn the workpiece end-for-end, when in said processing it is determined that:

(i) worst defects exist on only the first wide surface and the first edge surface of the workpiece and the workpiece has non-scant thickness and scant width;

(ii) worst defects exist on only the first wide surface and the second edge surface of the workpiece and the workpiece has non-scant thickness and non-scant width;

(iii) worst defects exist on only the second wide surface and first edge surface, and the workpiece has scant thickness and scant width; or (iv) worst defects exist on only the second wide surface and the second edge surface, and the workpiece has scant thickness and non-scant width;

i) orienting the workpiece by turning and flipping the workpiece one hundred eighty degrees end-for-end and one hundred and eighty degrees about its longitudinal axis respectively, when in said processing it is determined that:

(i) worst defects exist on only the first wide surface and the first edge surface and the workpiece has scant thickness and non-scant width;

(ii) worst defects exist on only the first wide surface and the second edge surface and the workpiece has scant thickness and scant width;

(iii) worst defects exist on only the second wide surface and the first edge surface and the workpiece has non-scant thickness and non-scant width; or (iv) worst defects exist on only the second wide surface and the second edge surface and the workpiece has non-scant thickness and scant width.

2. The method of claim 1 further comprising the step of weighting a priority face or edge of the workpiece when making an orientation decision for a workpiece.

3. A computer program product for use in an apparatus for optimizing orientation of a workpiece for feeding into a planer, wherein the planer includes:

a) a selectively actuable first cutterhead adjacent a first wide surface of the workpiece when in the planer, wherein the selectively actuable first cutterhead is selectively actuable so as to selectively adjust a depth of cut of the selectively actuable first cutterhead when planning the workpiece;

b) a fixed depth-of-cut second cutterhead adjacent a second wide surface opposite to said first wide surface;

c) a selectively actuable third cutterhead adjacent a first edge surface of the workpiece, wherein the third cutterhead is selectively actuable to adjust a depth-of-cut of the third cutterhead when planning the workpiece;

d) a fixed depth-of-cut fourth cutterhead adjacent a second edge surface opposite to the first edge surface;

and wherein the machine includes infeed means to the planer, means for selectively turning the workpiece end-for-end upstream of the planer on the infeed means, and means for selectively flipping the workpiece one hundred eighty degrees about its longitudinal axis upstream of the planer on the infeed means, the computer program product comprising:

e) a computer usable medium having computer readable program code means embodied in said medium for causing receiving data from the scanner for processing;

f) computer readable program code means for causing processing the received data from the scanner to detect and identify the location of the worst defects on the first and second oppositely oriented wide surfaces and on the first and second oppositely oriented edge surfaces of the workpiece;

g) computer readable program code means for causing orienting the workpiece by only flipping the workpiece one hundred eighty degrees about its longitudinal axis, when in said processing it is determined that:

(i) a worst defect exists on only the first wide surface of the workpiece and the workpiece has:

a) scant thickness and non-scant width, or b) scant thickness and scant width;

(ii) a worst defect exists on only the second wide surface and the workpiece and the workpiece has:

a) non-scant thickness and non-scant width, or b) non-scant thickness and scant width;

(iii) a worst defect exists on only the first edge surface and the workpiece has:

a) non-scant thickness and scant width, or b) scant thickness and scant width;

(iv) a worst defect exists on only the second edge surface and the workpiece has:

a) non-scant thickness and non-scant width, or b) non-scant thickness and scant width;

(v) worst defects exist on only the first wide surface and the first edge surface, and the workpiece has scant thickness and scant width;

(vi) worst defects exist on only the first wide surface and the second edge surface, and the workpiece has scant thickness and non-scant width;

(vii) worst defects exist on only the second wide surface and the first edge surface, and the workpiece has non-scant thickness and scant width; or (viii) worst defects exist on only the second wide surface and the second edge surface, and the workpiece has non-scant thickness and non-scant width;

h) computer readable program code means for causing orienting the workpiece by only turning the workpiece one hundred eighty degrees about an axis generally orthogonal to the wide surfaces so as to turn the workpiece end-for-end, when in said processing it is determined that:

(i) worst defects exist on only the first wide surface and the first edge surface of the workpiece and the workpiece has non-scant thickness and scant width;

(ii) worst defects exist on only the first wide surface and the second edge surface of the workpiece and the workpiece has non-scant thickness and non-scant width;

(iii) worst defects exist on only the second wide surface and first edge surface, and the workpiece has scant thickness and scant width; or (iv) worst defects exist on only the second wide surface and the second edge surface, and the workpiece has scant thickness and non-scant width;

i) computer readable program code means for causing orienting the workpiece by turning and flipping the workpiece one hundred eighty degrees end-for-end and about its longitudinal axis respectively, when in said processing it is determined that:

(i) worst defects exist on only the first wide surface and the first edge surface and the workpiece has scant thickness and non-scant width;

(ii) worst defects exist on only the first wide surface and the second edge surface and the workpiece has scant thickness and scant width;

(iii) worst defects exist on only the second wide surface and the first edge surface and the workpiece has non-scant thickness and non-scant width; or (iv) worst defects exist on only the second wide surface and the second edge surface and the workpiece has non-scant thickness and scant width.

4. The computer program product of claim 3 further comprising computer readable program code means for weighting a priority face or edge of the workpiece when making an orientation decision for the workpiece.

5. An apparatus for optimizing orientation of a workpiece in a planermill for feeding of the workpiece into a planer, the apparatus comprising:

a planer having:

a) a selectively actuable first cutterhead adjacent a first wide surface of the workpiece when in the planer, wherein the selectively actuable first cutterhead is selectively actuable so as to selectively adjust a depth of cut of the selectively actuable first cutterhead when planning the workpiece;

b) a fixed depth-of-cut second cutterhead adjacent a second wide surface opposite to said first wide surface;

c) a selectively actuable third cutterhead adjacent a first edge surface of the workpiece, wherein the third cutterhead is selectively actuable to adjust a depth-of-cut of the third cutterhead when planning the workpiece;

d) a fixed depth-of-cut fourth cutterhead adjacent a second edge surface opposite to the first edge surface;

infeed means to the planer, means for selectively turning the workpiece end-for-end upstream of the planer on the infeed means, and means for selectively flipping the workpiece one hundred eighty degrees about a longitudinal axis of the workpiece upstream of the planer on the infeed means, a scanner on said infeed means for detecting defects on the workpiece, said scanner upstream of said means for selectively turning the workpiece and said means for selectively flipping the workpiece, a processor cooperating with said scanner and said means for selectively turning the workpiece and said means for selectively flipping the workpiece for optimizing the orientation of the workpiece relative to said first, second, third and fourth cutterheads.

6. The apparatus of claim 5 wherein said processor comprises:

a) means for receiving data from said scanner for processing in said processor b) means for processing the received data from said scanner to detect and identify the location of worst defects on the first and second oppositely oriented wide surfaces and on the first and second oppositely oriented edge surfaces of the workpiece c) means for actuating said means for selectively flipping the workpiece so as to orient the workpiece by only flipping the workpiece one hundred eighty degrees about its longitudinal axis, when said means for processing determines that:

(i) a worst defect exists on only the first wide surface of the workpiece and the workpiece has:
a) scant thickness and non-scant width, or
b) scant thickness and scant width;

(ii) a worst defect exists on only the second wide surface and the workpiece and the workpiece has:
a) non-scant thickness and non-scant width, or
b) non-scant thickness and scant width;

(iii) a worst defect exists on only the first edge surface and the workpiece has:
a) non-scant thickness and scant width, or
b) scant thickness and scant width;

(iv) a worst defect exists on only the second edge surface and the workpiece has:
a) non-scant thickness and non-scant width, or
b) non-scant thickness and scant width;

(v) worst defects exist on only the first wide surface and the first edge surface, and the workpiece has scant thickness and scant width;

(vi) worst defects exist on only the first wide surface and the second edge surface, and the workpiece has scant thickness and non-scant width;

(vii) worst defects exist on only the second wide surface and the first edge surface, and the workpiece has non-scant thickness and scant width; or (viii) worst defects exist on only the second wide surface and the second edge surface, and the workpiece has non-scant thickness and non-scant width;

d) means for actuating said means for selectively turning the workpiece so as to orient the workpiece by only turning the workpiece one hundred eighty degrees about an axis generally orthogonal to the wide surfaces so as to turn the workpiece end-for-end, when said means for processing determines that:

(i) worst defects exist on only the first wide surface and the first edge surface of the workpiece and the workpiece has non-scant thickness and scant width;

(ii) worst defects exist on only the first wide surface and the second edge surface of the workpiece and the workpiece has non-scant thickness and non-scant width;

(iii) worst defects exist on only the second wide surface and first edge surface, and the workpiece has scant thickness and scant width; or (iv) worst defects exist on only the second wide surface and the second edge surface, and the workpiece has scant thickness and non-scant width;

e) means for actuating said means for selectively turning the workpiece and said means for selectively flipping the workpiece so as to orient the workpiece by turning and flipping the workpiece one hundred eighty degrees about its longitudinal axis respectively, when said means for processing determines that:

(i) worst defects exist on only the first wide surface and the first edge surface and the workpiece has scant thickness and non-scant width;

(ii) worst defects exist on only the first wide surface and the second edge surface and the workpiece has scant thickness and scant width;

(iii) worst defects exist on only the second wide surface and the first edge surface and the workpiece has non-scant thickness and non-scant width; or (iv) worst defects exist on only the second wide surface and the second edge surface and the workpiece has non-scant thickness and scant width.

7. The apparatus of claim 6 wherein said means for processing weights a priority face or edge of the workpiece when making an orientation decision for the workpiece.

8. The apparatus of claim 5 wherein said means for selectively turning the workpiece includes:

a) a selectively actuable workpiece diverter on said infeed means for selectively removing a workpiece from said infeed means, b) a turn transfer cooperating with said workpiece diverter, c) a return transfer for translating the workpiece, once turned, upstream along said infeed means, d) a workpiece conveyer for conveying the workpiece from said return transfer to said infeed means once upstream along said infeed means.

9. The apparatus of claim 8 wherein said means for selectively flipping the workpiece includes an automatic board turner for flipping the workpiece about its longitudinal axis.

10. The apparatus of claim 8 wherein said workpiece diverter is a dropout gate.

11. The apparatus of claim 5 wherein said scanner is for detecting wane on the workpiece, and wherein said worst defects are areas of worst wane on the surfaces of the workpiece, and wherein the workpiece is a board.

12. The apparatus of claim 11 wherein said scanner is an optical scanner.

13. The apparatus of claim 12 wherein said turn transfer is a one hundred eighty degree arcuate transfer extending under said infeed means, and wherein a lateral conveyer feeds the workpiece from said dropout gate onto said turn transfer.

14. The apparatus of claim 13 wherein said return transfer is parallel to said infeed means.

15. The apparatus of claim 14 wherein both said return transfer and said infeed means include lugged transfer chains.

* * * * *